US009914393B2

(12) United States Patent
Di Giusto et al.

(10) Patent No.: US 9,914,393 B2
(45) Date of Patent: Mar. 13, 2018

(54) PIVOT MECHANISM AND ASSEMBLY FOR A VEHICLE EXTERNAL REAR VIEW DEVICE

(71) Applicant: SMR Patents S.à.r.l., Luxembourg (LU)

(72) Inventors: Nathan Di Giusto, Adelaide (AU); Simon Orme, Daw Park (AU); Simon Belcher, South Plympton (AU); Daniel Joseph Flynn, Morphett Vale (AU)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 15/390,083

(22) Filed: Dec. 23, 2016

(65) Prior Publication Data

US 2017/0106799 A1   Apr. 20, 2017

Related U.S. Application Data

(63) Continuation-in-part of application No. 14/889,685, filed as application No. PCT/IB2014/061261 on May 7, 2014, now Pat. No. 9,555,741, and a continuation-in-part of application No. PCT/IB2015/055930, filed on Aug. 5, 2015.

(30) Foreign Application Priority Data

May 8, 2013   (AU) ................................ 2013901634
Aug. 6, 2014   (AU) ................................ 2014903044

(51) Int. Cl.
*B60R 1/076*   (2006.01)
*B60R 1/06*    (2006.01)

(52) U.S. Cl.
CPC ................ *B60R 1/076* (2013.01); *B60R 1/06* (2013.01); *Y10T 16/54028* (2015.01)

(58) Field of Classification Search
CPC ......... B60R 1/06; B60R 1/076; B60R 1/0617; B60R 1/074; Y10T 16/54028; Y10T 16/54044; E05D 11/1071; E05D 11/1085
USPC ................ 16/334, 344; 248/475.1, 476–478, 248/289.11; 359/841, 871, 872
See application file for complete search history.

(56) References Cited

U.S. PATENT DOCUMENTS 1,595,557 A  *  8/1926  Mamiya ................. B62K 21/16
                                                          403/103
3,119,591 A  *  1/1964  Malecki ................ B60R 1/0617
                                                          248/282.1

(Continued)

*Primary Examiner* — William Miller
(74) *Attorney, Agent, or Firm* — MacMillan, Sobanski & Todd, LLC

(57) ABSTRACT

A pivot mechanism for a vehicle external rear view mirror assembly is disclosed. The mechanism includes: a base frame portion and a case frame portion mounted to the base frame portion for rotation about a pivot axis. A detent is operable between the base frame portion and the case frame portion. A spring mechanism clamps the case frame portion to the base frame portion and includes a compression spring disposed around the axis and a spring tie. The spring has first and second tie ends spaced apart from each other and connected by a tie shaft. The tie shaft passes through the spring. The spring tie shaft includes a spring tie reaction feature, whereby in a deployed position, a torque applied to the case frame portion about an axis orthogonal to the axis by an external force is resisted by the spring tie reaction feature.

9 Claims, 42 Drawing Sheets

(56) References Cited

U.S. PATENT DOCUMENTS

| | | | |
|---|---|---|---|
| 3,339,876 A * | 9/1967 | Kampa | B60R 1/0617 248/478 |
| 3,384,334 A * | 5/1968 | Malachowski | B60R 1/0617 248/289.11 |
| 3,637,186 A * | 1/1972 | Greenfield | B60R 1/0617 248/289.11 |
| 4,186,905 A * | 2/1980 | Brudy | B60R 1/0617 16/321 |
| 4,789,232 A * | 12/1988 | Urbanek | B60R 1/076 248/475.1 |
| 4,829,633 A * | 5/1989 | Kassner | E05D 11/1085 16/250 |
| 5,143,468 A * | 9/1992 | Pausch | F16C 11/10 16/322 |
| 6,092,778 A * | 7/2000 | Lang | B60R 1/0617 16/322 |
| 6,244,779 B1 * | 6/2001 | Slasinski | F16C 11/10 403/110 |
| 6,286,968 B1 * | 9/2001 | Sailer | B60R 1/0617 248/478 |
| 6,742,756 B1 * | 6/2004 | Fimeri | B60R 1/074 248/478 |
| 7,137,715 B2 * | 11/2006 | Schuurmans | B60R 1/06 248/479 |
| 7,331,552 B2 * | 2/2008 | Sample | F16C 11/04 248/289.11 |
| 7,393,111 B2 * | 7/2008 | Fuchs | B60R 1/076 248/477 |
| 7,452,088 B2 * | 11/2008 | Brester | B60R 1/076 248/478 |
| 7,546,997 B2 * | 6/2009 | Van Stiphout | B60R 1/076 248/476 |
| 7,686,274 B2 * | 3/2010 | Branham | B60R 1/0617 248/477 |
| 7,887,202 B1 * | 2/2011 | Peterson | B60R 1/074 359/841 |
| 8,157,395 B2 * | 4/2012 | Itoh | B60R 1/074 359/872 |
| 8,336,845 B1 * | 12/2012 | Courbon | B60R 1/076 248/479 |
| 8,720,845 B2 * | 5/2014 | Courbon | B60R 1/0612 16/343 |
| 2007/0165315 A1 * | 7/2007 | Proctor | B60R 1/076 359/871 |

* cited by examiner

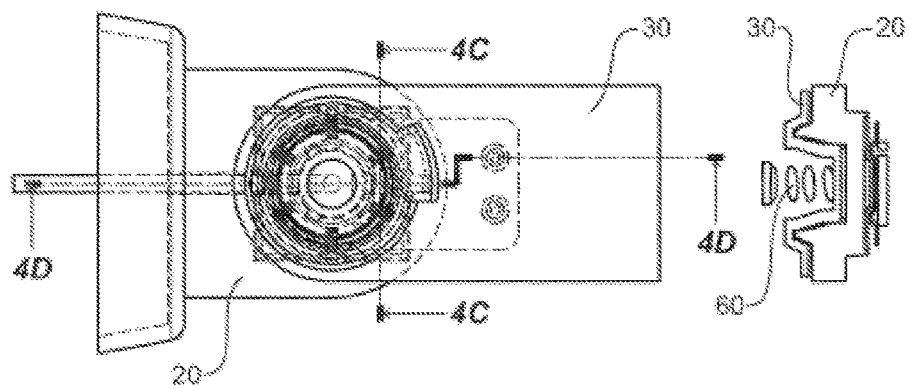
*Figure 4A*  *Figure 4C*
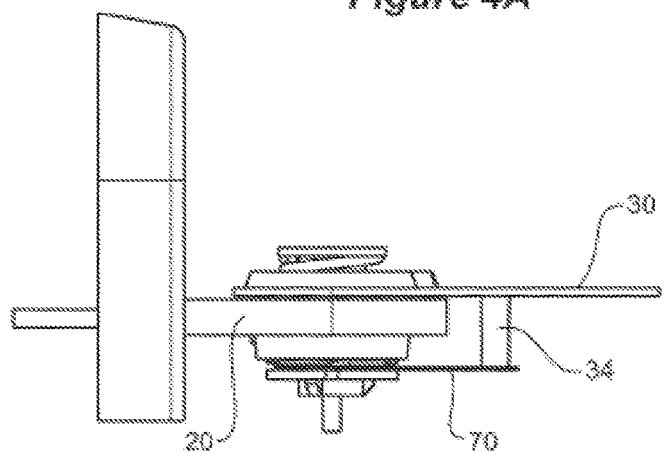
*Figure 4B*
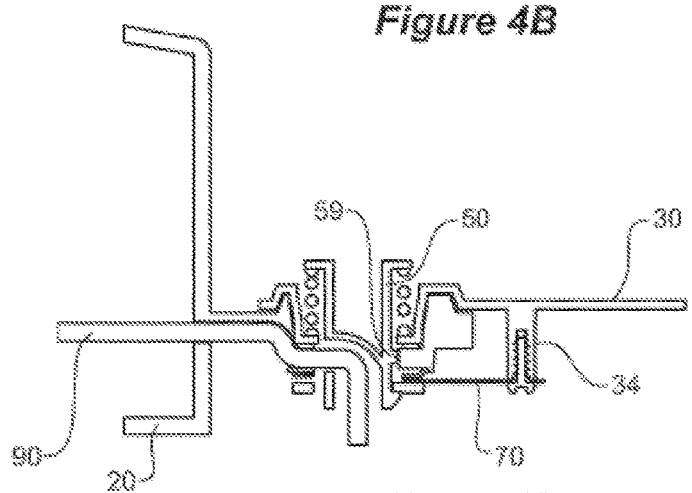
*Figure 4D*

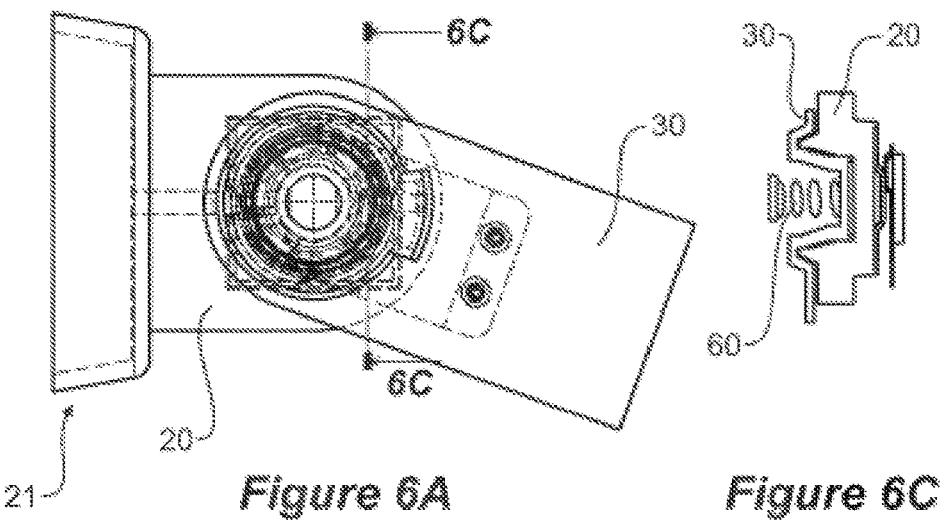
*Figure 6A*  *Figure 6C*
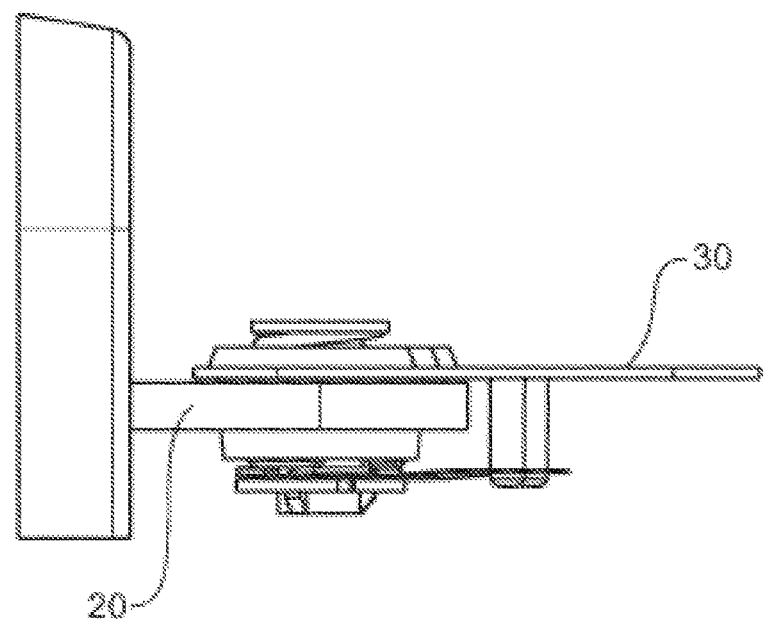
*Figure 6B*

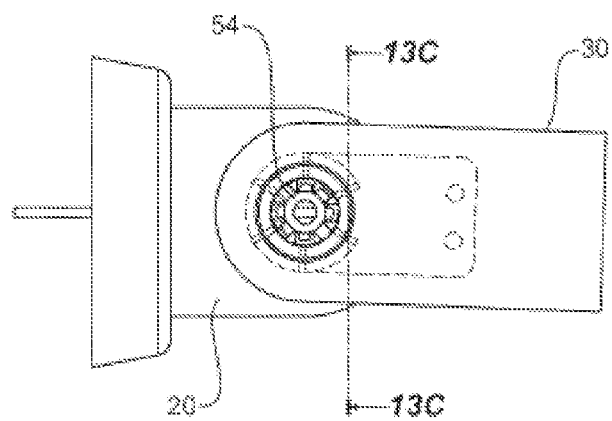
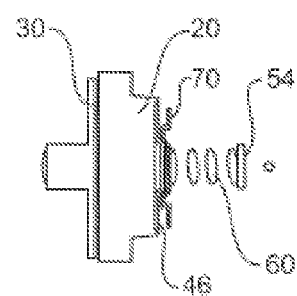
Figure 13A        Figure 13C
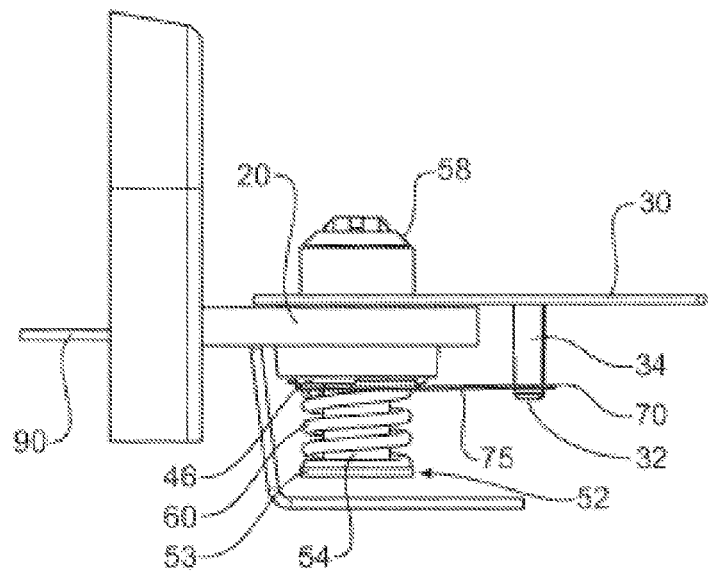
Figure 13B

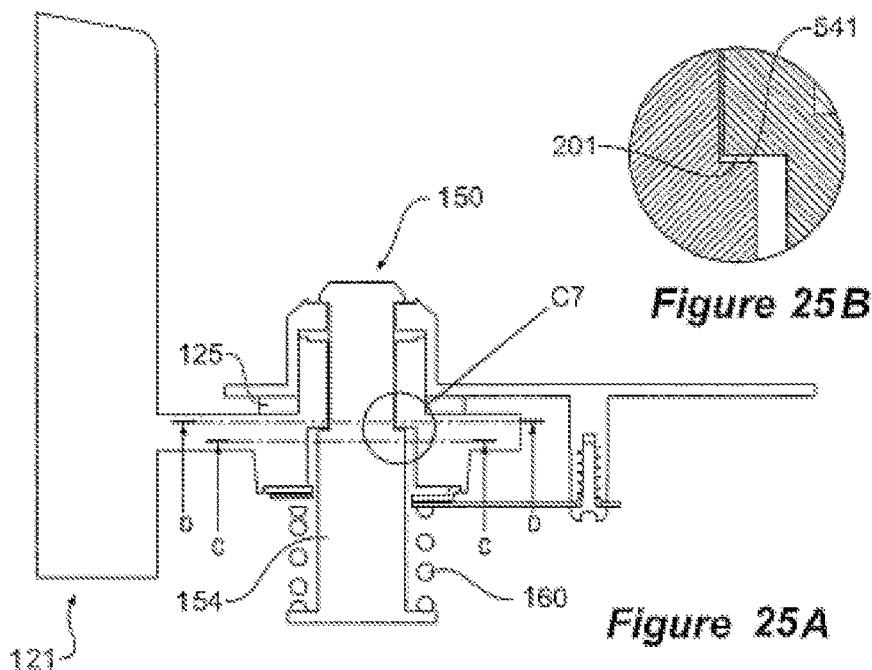
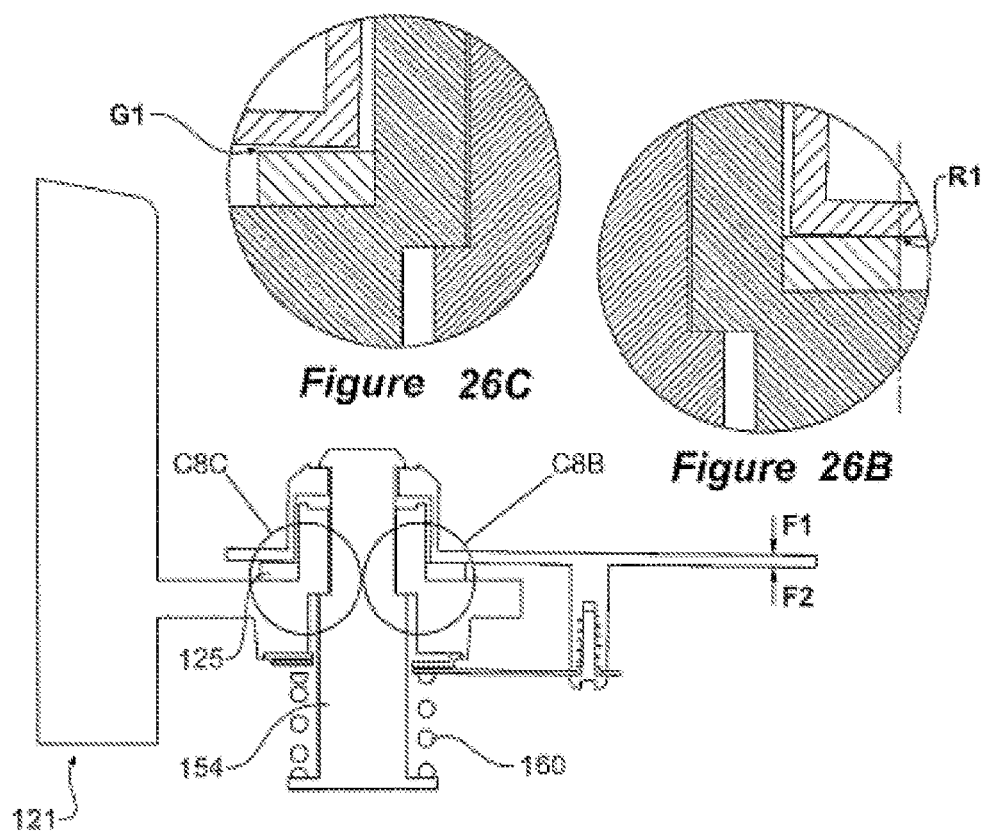

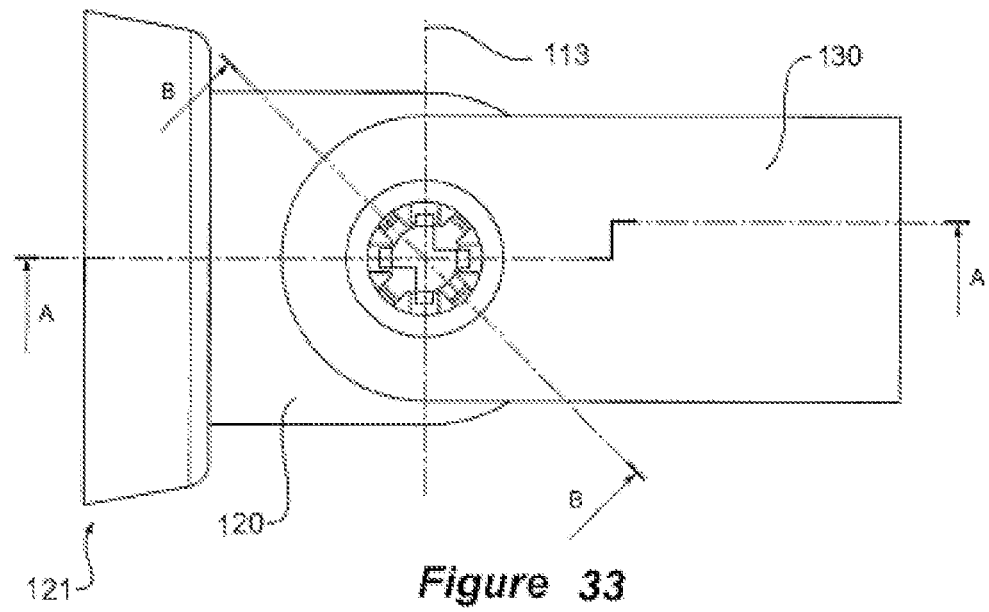
Figure 33
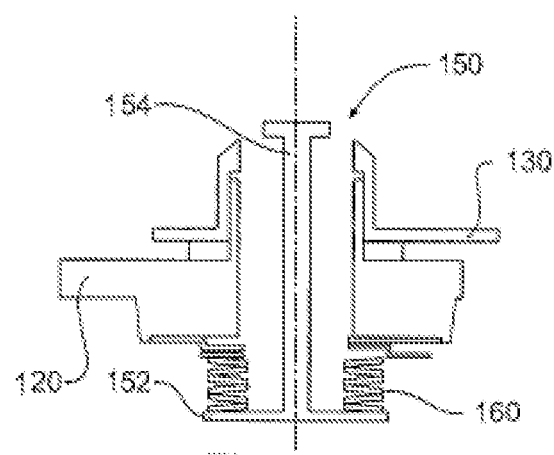
Figure 34
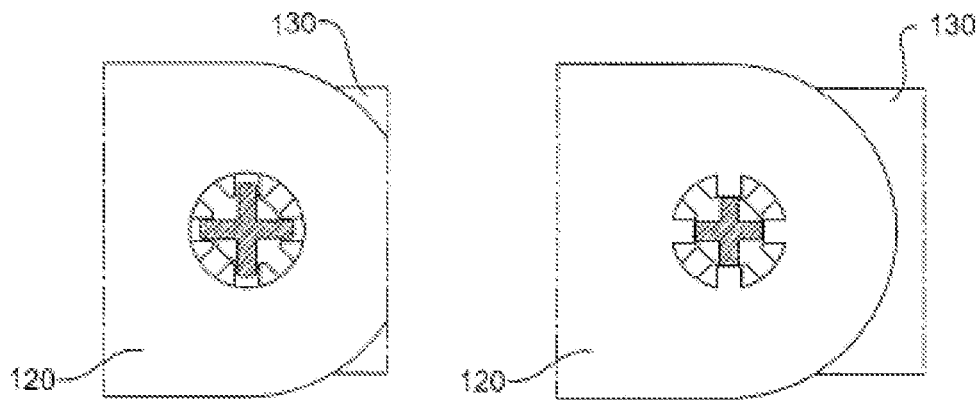
Figure 37
Figure 38

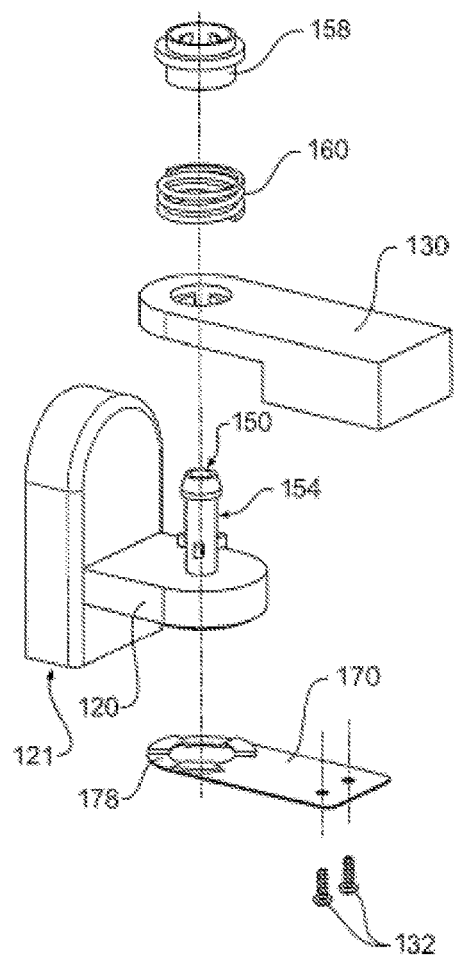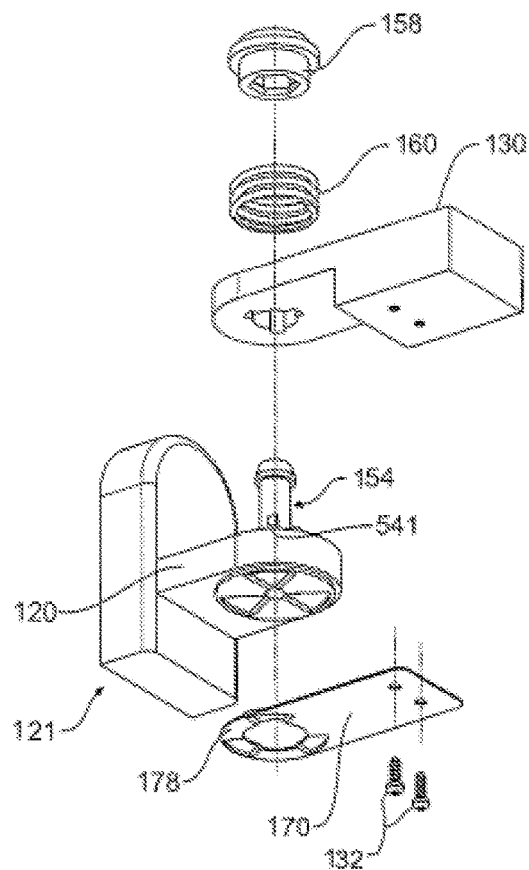
Figure 46
Figure 47

PIVOT MECHANISM AND ASSEMBLY FOR A VEHICLE EXTERNAL REAR VIEW DEVICE

CROSS-REFERENCE TO RELATED APPLICATIONS

This application is a continuation-in-part application of U.S. patent application Ser. No. 14/889,685, filed Nov. 6, 2015. U.S. patent application Ser. No. 14/889,685 is the National Phase of International Application PCT/IB2014/061261 filed May 7, 2014 which designated the U.S. and was published in English on Nov. 13, 2014 as International Publication Number WO/2014/181265. PCT/IB2014/061261 claims priority to Australian Patent Application No. 2013901634, filed May 8, 2013. This application further claims priority to International Patent Application No. PCT/IB2015/055930, filed Aug. 5, 2015. PCT/IB2015/055930 was published in English on Feb. 11, 2016 as International Publication Number WO 2016/020847 A1. PCT/IB2015/055930 claims priority to Australian Provisional Patent Application No. 2014903044, filed Aug. 6, 2014. Thus, the subject nonprovisional application claims priority to Australian Provisional Application No. 2013901634, filed May 8, 2013 and Australian Provisional Patent Application No. 2014903044, filed Aug. 6, 2014. The disclosures of the listed applications are incorporated herein by reference in their entirety.

BACKGROUND OF THE INVENTION

This invention relates to vehicle rear view devices. In particular, this invention relates to vehicle side-mountable rear vision devices, such as mirrors or cameras, that are pivotably movable with respect to a mounting point on a vehicle's side.

Vehicle rear view devices, in particular vehicle rear view side mirrors, commonly include a mirror head that is pivotally attached to a mounting bracket or mirror base. The mounting bracket or base is secured to the vehicle body (for instance, the door or front fender). The pivot enables the mirror head to rotate with respect to the bracket to either allow movement of the mirror head in response to an impact while the vehicle is moving or stationary (referred to as "mirror breakaway"), or to move to a parked position under the action of a drive means to ensure that the mirror head and its internal case frame is moved to a position where it is as close to the vehicle body as possible.

A detent is typically included in a pivot mechanism within the vehicle mirror or rear vision device described above. The detent provides a positive location and holding force for the mirror or rear vision device in at least a deployed or drive position as it is rotated about the pivot. The detent resists initial movement of the pivot and requires a minimum force in order to overcome the detent holding force.

Commonly, detent mechanisms include a detent feature on the mounting bracket or mirror base and a further detent feature on the mirror head or mirror case frame. With such an arrangement, typically the mirror head is displaced upwards as it rotates out of detent.

While a pivot mechanism that enables the mirror head, or any rear vision device including a camera, to rotate with respect to the bracket about a pivot axis clearly has many advantages, it does provide the designer with challenges in relation to the durability and strength of the overall rear vision assembly. In particular, the assembly in a deployed or drive position, must be able to withstand a torque applied to the mirror head, and hence the internal case frame, about an axis orthogonal to the pivot axis by an external down force.

In some applications, it is desirable to provide a pivot mechanism whereby there is no axial lifting of the mirror head with respect to the base during rotation or pivoting. In other applications, it is desirable to provide a pivot mechanism that is able to withstand a torque applied to the mirror head, and hence the internal case frame, about an axis orthogonal to the pivot axis by an external down force. In addition, it would be desirable to at least provide the public with a useful choice.

In certain instances, it would be desirable to provide a pivot mechanism that provides swivel or rotary motion of the mirror head without an axial movement component or to at least provide the public with a useful choice. In other instances, it may be desirable to also provide a rear view assembly capable of withstanding a certain torque level applied to the deployed assembly by an external downward force.

SUMMARY OF THE INVENTION

This invention relates in general to pivot mechanisms for rear view devices. In one aspect of the invention, there is provided a pivot mechanism for a vehicle external rear view mirror assembly, the pivot mechanism including:

a base frame portion integral with, or attachable to, a vehicle-mountable base frame;

a case frame portion mounted to the base frame portion for rotation about a pivot axis, the case frame portion integral with, or attachable to, a case frame adapted to support a rear vision mirror;

a detent operable between the base frame portion and the case frame portion, the detent having:

an engaged position where the case frame portion is held in a selected position with respect to the base frame portion, and a disengaged position allowing the rotation about the pivot axis, the detent including a first set of detent features and a second set of detent features;

a spring mechanism clamping the case frame portion to the base frame portion and the first set of detent features to the second set of detent features; and a support arm having an attachment end and a floating end, the floating end supporting the first set of detent features, the first set of detent features fixed against rotation about the pivot axis with respect to the support arm, but displaceable relative to the attachment end in a direction substantially parallel to the pivot axis, wherein the attachment end of the support arm is fixed to, and is fixed against rotation with respect to, one of: the case frame portion and the base frame, and wherein the second set of detent features is fixed against rotation with respect to the other of: the case frame portion and the base frame portion.

In one embodiment, the spring mechanism provides a first clamping force clamping the case frame portion to the base frame portion and a second clamping force clamping the first set of detent features to the second set of detent features, the first and second clamping forces being of equal magnitude.

In one embodiment, the first and second clamping forces are higher in the disengaged position than they are in the engaged position.

In one embodiment, the spring mechanism includes:

a compression spring; and a spring tie, the spring tie having a first tie end and a second tie end, the a first and second tie ends spaced apart from each other and connected by a tie portion, the tie portion passing through the spring.

In one embodiment, the spring mechanism includes a resilient arm portion, the resilient arm portion between the attachment end and the floating end of the support arm.

In one embodiment, the first and second clamping forces arise from the sum of a first spring force produced by the compression spring and a second spring force produced by the resilient arm portion.

In one embodiment, the support arm and the first set of detent features are formed as a unitary component.

In one embodiment, the support arm and the first set of detent features are formed from spring steel.

In one embodiment, the relative axial positions of the base frame portion and the case frame portion remain unchanged from between the engaged position and the disengaged position.

In one embodiment, the spring mechanism includes:
a resilient arm portion, the arm resilient arm portion between the attachment end and the floating end of the support arm.

In one embodiment, the spring mechanism consists of the arm portion, the arm portion including a resilient arm portion between the attachment end and the floating end of the support arm.

In one embodiment, the attachment end of the support arm is attached to the case frame portion.

According to another aspect of the invention, there is provided a pivot mechanism for a vehicle external rear vision assembly, the pivot mechanism including:
a base frame portion integral with, or attachable to, a vehicle-mountable base frame;
a case frame portion mounted to the base frame portion for rotation about a pivot axis, the case frame portion integral with, or attachable to, a case frame adapted to support a rear vision mirror, the case frame movable about the pivot axis from a deployed position to a folded position;
a detent operable between the base frame portion and the case frame portion, the detent having: an engaged position where the case frame portion is held in a selected position with respect to the base frame portion, and a disengaged position allowing the rotation about the pivot axis;
a spring mechanism clamping the case frame portion to the base frame, the spring mechanism including:
    a compression spring disposed around the pivot axis, the compression spring having an internal radius; and
    a spring tie, the spring tie having a first tie end and a second tie end, the a first and second tie ends spaced apart from each other and connected by a tie shaft, the tie shaft passing through the spring, the spring tie shaft including a spring tie reaction feature,
whereby the case frame portion, the base frame portion and the spring tie are mutually arranged and constructed such that, in the deployed position, a torque applied to the case frame portion about an axis orthogonal to the pivot axis by an external force is resisted by the spring tie reaction feature.

In one form the spring tie reaction feature includes a plurality of spring tie reaction surfaces.

In one form the plurality of spring tie reaction surfaces are circumferentially spaced apart around the spring tie shaft.

In one form each spring tie reaction surface is located radially inboard of the internal radius of the compression spring.

In one form the compression spring includes one or more disc springs.

In one form the spring includes a first spring end and a second spring end, the first spring end compressed retained in compression against either one of the first and second tie ends.

In one form the pivot mechanism further includes a powerfold mechanism operably interposed between the base frame portion and the case frame portion, wherein the powerfold mechanism is operable to electrically drive the case frame portion with respect to the base frame portion.

According to a another aspect of the invention, there is provided a pivot mechanism for a vehicle external rear vision assembly, the pivot mechanism including:
a base frame portion integral with, or attachable to, a vehicle-mountable base frame;
a case frame portion mounted to the base frame portion for rotation about a pivot axis, the case frame portion integral with, or attachable to, a case frame adapted to support a rear vision mirror, the case frame movable about the pivot axis from a deployed position to a folded position;
a spring mechanism clamping the case frame portion to the base frame, the spring mechanism including:
    a compression spring disposed around the pivot axis, the compression spring having an internal radius; and
    a spring tie, the spring tie having a first tie end and a second tie end, the first and second tie ends spaced apart from each other and connected by a tie shaft, the tie shaft passing through the spring, the spring tie shaft including a spring tie reaction feature,
whereby, in a deployed position, the spring tie reaction feature is positioned such that rotation of the case frame portion about an axis orthogonal to the pivot axis is resisted the spring tie reaction feature.

According to a yet another aspect of the invention, there is provided a pivot mechanism for a vehicle external rear vision assembly, the mechanism including:
a base frame portion integral with, or attachable to, a vehicle-mountable base frame;
a case frame portion mounted to the base frame portion for rotation about a pivot axis, the case frame portion integral with, or attachable to, a case frame adapted to support a rear vision mirror;
a detent operable between the base frame portion and the case frame portion, the detent having:
    an engaged position where the case frame portion is held in a selected position with respect to the base frame portion, and
    a disengaged position allowing the rotation about the pivot axis, the detent including a first set of detent features and a second set of detent features;
a spring mechanism clamping the case frame portion to the base frame portion and the first set of detent features to the second set of detent features;
a support arm having an attachment end and a floating end, the floating end supporting the first set of detent features, the first set of detent features fixed against rotation about the pivot axis with respect to the support arm, but displaceable relative to the attachment end in a direction substantially parallel to the pivot axis; and
a powerfold mechanism operably interposed between the base frame portion and the case frame portion, the powerfold mechanism including the second set of detent features,
wherein the attachment end of the support arm is fixed to, and is fixed against rotation with respect to, one of: the case frame portion and the base frame, and
wherein the second set of detent features is fixed against rotation with respect to the other of: the case frame portion and the base frame portion, and wherein the powerfold mechanism is operable to electrically drive the case frame portion with respect to the base frame portion.

Various aspects of this invention will become apparent to those skilled in the art from the following detailed description of the preferred embodiment, when read in light of the accompanying drawings.

BRIEF DESCRIPTION OF THE DRAWINGS

FIG. 4A shows the pivot mechanism of FIGS. 1 and 2 in a top view in the drive detent position.

FIG. 4B shows the pivot mechanism of FIGS. 1 and 2 in a side view in the drive detent position.

FIG. 4C shows the pivot mechanism of FIGS. 1 and 2 in a cross-sectional view taken through section lines 4C-4C, as indicated on FIG. 4A.

FIG. 4D shows the pivot mechanism of FIGS. 1 and 2 in a cross-sectional view taken through section lines 4C-4C, as shown in FIG. 4A.

FIG. 6A shows the pivot mechanism of FIGS. 1 and 2 in a top view in the out of detent position.

FIG. 6B shows the pivot mechanism of FIGS. 1 and 2 in a side view in the out of detent position.

FIG. 6C shows the pivot mechanism of FIGS. 1 and 2 in a cross-sectional view taken through section lines 6C-6C, as indicated on FIG. 6A.

FIG. 13A shows the pivot mechanism of FIGS. 10 and 11 in a top view in a position departing the drive detent.

FIG. 13B shows the pivot mechanism of FIGS. 10 and 11 in a side view in a position departing the drive detent.

FIG. 13C shows the pivot mechanism of FIGS. 10 and 11 in a cross-sectional view taken through section lines 13C-13C, as indicated on FIG. 13A.

FIG. 25A is a cross-sectional view through section lines A-A shown on FIG. 23 while the pivot mechanism is in its normal drive position.

FIG. 25B is a magnified view of the portion of the pivot mechanism indicated by circle C7 on FIG. 25A.

FIG. 26A is a cross-sectional view through section lines A-A shown on FIG. 23 with a down force applied to the mirror head, the down force inducing a torque about an axis orthogonal to the pivot axis.

FIG. 26B is a magnified view of the portion of the pivot mechanism indicated by circle C8 on FIG. 26A.

FIGS. 31, 32 and 33 are isometric, side and plan views of the pivot mechanism shown in FIGS. 29 and 30, with the pivot mechanism in a deployed or drive position.

FIG. 34 is a cross-sectional view through section lines B-B shown on FIG. 33.

FIGS. 37 and 38 are cross-sectional views through section lines C-C and D-D shown on FIG. 25A.

FIG. 46 is an exploded isometric view of a pivot mechanism according to a yet another embodiment of the invention looking from above.

FIG. 47 is an exploded isometric view of the pivot mechanism shown in FIG. 46 looking from below.

DETAILED DESCRIPTION OF THE PREFERRED EMBODIMENT

Figure 1:
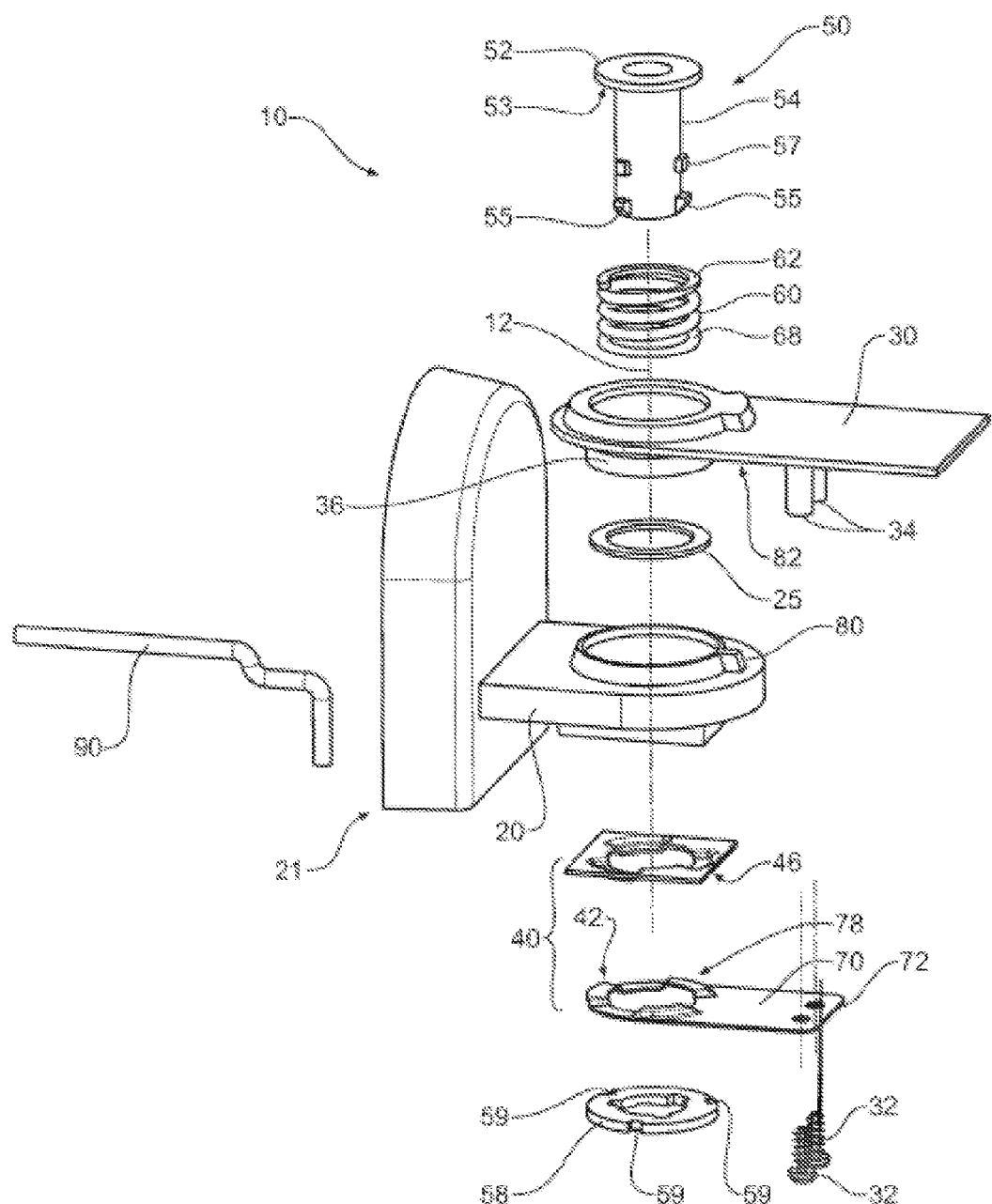
FIG. 1 is an exploded isometric view of a pivot mechanism according to the invention.
Figure 2:
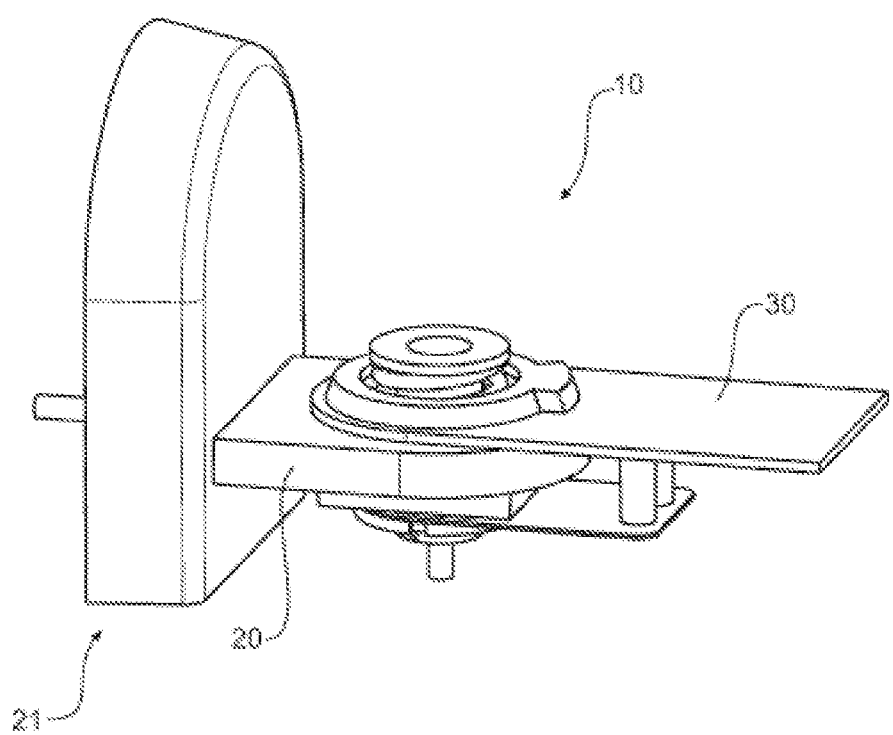
FIG. 2 is an isometric view of a pivot mechanism shown in FIG. 1.

Referring now to FIGS. 1 and 2, there is shown a pivot mechanism 10 for a vehicle external rear view mirror assembly. The mechanism includes a base frame portion 20 for a vehicle-mountable base frame and a case frame portion 30 mounted to the base frame portion 20 for rotation about a pivot axis 12. The base frame portion 20 may be integral with a base frame, or may be a separate component attached to, or attachable to, other base frame portions. Similarly, the case frame portion 30 may be integral with a case frame, or may be a separate component attached to, or attachable to, other case frame portions.

Typically, the case frame supports a mirror and a decorative case housing. The case frame, mirror and decorative housing are all rotatable together with respect to the base frame, which is typically fixed to a vehicle door.

A detent 40 operable between the base frame portion 20 and the case frame portion 30 is provided. The detent 40 has an engaged position shown in FIGS. 2, 3A, 4A, 4B, 4C and 4D. In this engaged position, the case frame portion 30 is held in a selected position with respect to the base frame portion 20. The detent also has a disengaged position illustrated in FIGS. 3B, 6A, 6B and 6C, allowing rotation about the pivot axis 12.

The detent 40 includes a first set of detent features 42 and a second set of detent features 46. The first set of detent features 42 are fixed against rotation about the pivot axis 12 but is axially movable with respect to both the case frame portion 30 and the base frame portion 20. The second set of detent features 46 are fixed against rotation with respect to the base frame portion 20. A spring assembly including a spring retainer or spring tie 50 and a spring 60 clamps the case frame portion 30 to the base frame portion 20 and also clamps the first set of detent features 42 to the second set of detent features 46.

The pivot mechanism 10 also includes a detent member support arm 70, having a first attachment end 72 and a second floating end 78. The first attachment end 72 is mounted to the case frame portion 30 for rotation therewith. The second floating end 78 is displaceable relative to the case frame portion 30 in a direction substantially parallel to the pivot axis 12.

The spring assembly includes a spring retainer or spring tie 50 having a first retaining end 52 and a second retaining end 58, the first and second retaining ends 52,58 spaced apart from each other, and a compression spring 60 having a first spring end 62 and a second spring end 68. The spring assembly is disposed between a flange 53 of the first retaining end 52 of the spring tie 50 and the case frame 30, as is most clearly shown in the cross-sectional views of FIGS. 3A and 3B read together with the exploded view of FIG. 1. The first spring end 62 bears against the first retaining end 52 of the spring tie 50 and the second spring end 68 bears against the case frame 30.

Figure 3A:
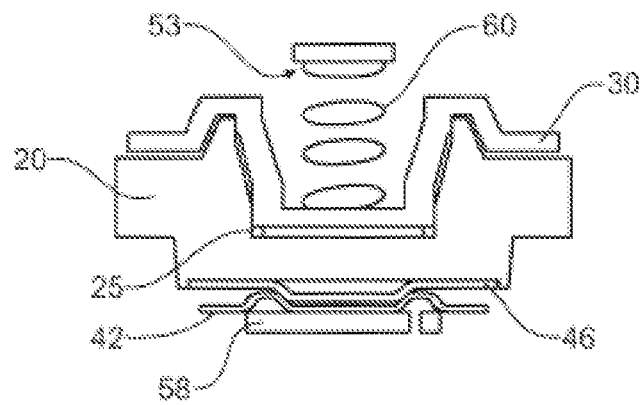
FIGS. 3A and 3B are cross-sectional views of the pivot mechanism shown in FIGS. 1 and 2, showing the pivot mechanism in a deployed or drive position and an out of detent position respectively.
Figure 3B:
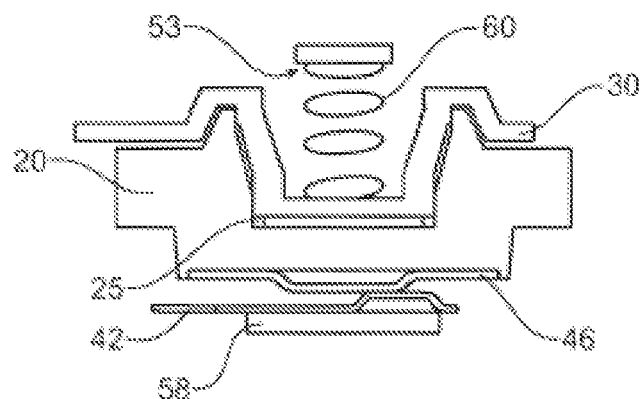

A bearing washer 25 is disposed between the second spring end 68 and the case frame 30, as is most clearly shown in FIGS. 3A and 3B.

Referring now to FIGS. 1, 3A and 3B, the detent 40 will be described in more detail.

In FIG. 3A, it can be seen that the first set of detent features 42 is pressed into engagement with the second set of detent features 46 through the clamping force generated between the second retainer end 58 and the base frame 20. This clamping force is generated by the spring 60, which pushes against the flange 53 of the first retaining end 52 of the spring tie 50. This upwards force is transmitted through a tie in the form of a tube 54 (as shown in FIG. 1) to the second retainer end 58 of the spring tie 50. The second retainer end 58 pushes upwards to press the first set of detent features 42 against the second set of detent features 46.

Turning to FIGS. 4A, 4B, 4C and 4D, it can be seen that the first set of detent features 42 is mounted on a detent member support arm 70 (most clearly shown in FIGS. 4B and 4D). The detent member support arm 70 is attached to screw receiving bosses 34 by screws 32, as is most clearly shown in FIGS. 1 and 4D.

Figures 5A, 5C:
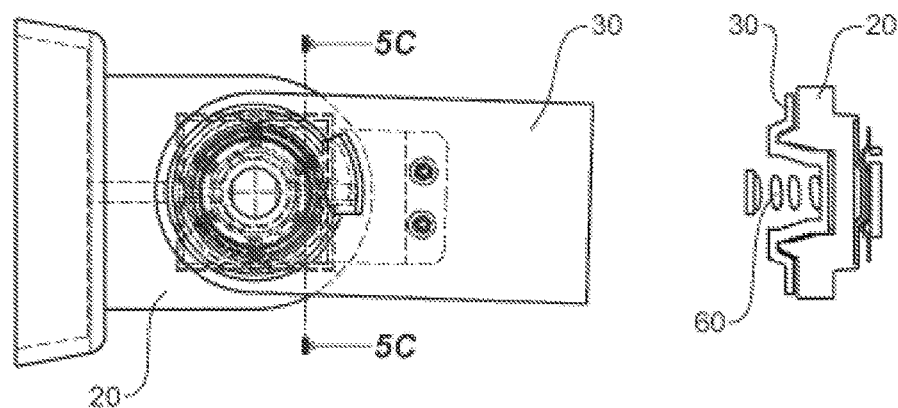
FIG. 5A shows the pivot mechanism of FIGS. 1 and 2 in a top view in a position departing the drive detent.
FIG. 5C shows the pivot mechanism of FIGS. 1 and 2 in a cross-sectional view taken through section lines 5C-5C, as indicated on FIG. 5A.
Figure 5B:
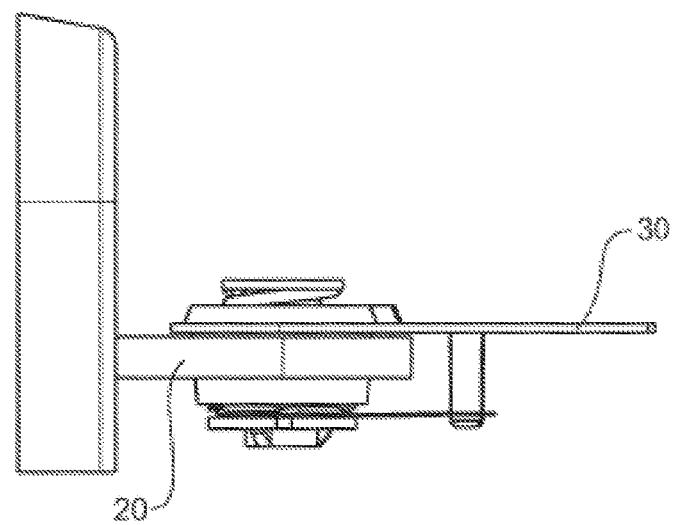
FIG. 5B shows the pivot mechanism of FIGS. 1 and 2 in a side view in a position departing the drive detent.
Figure 7:
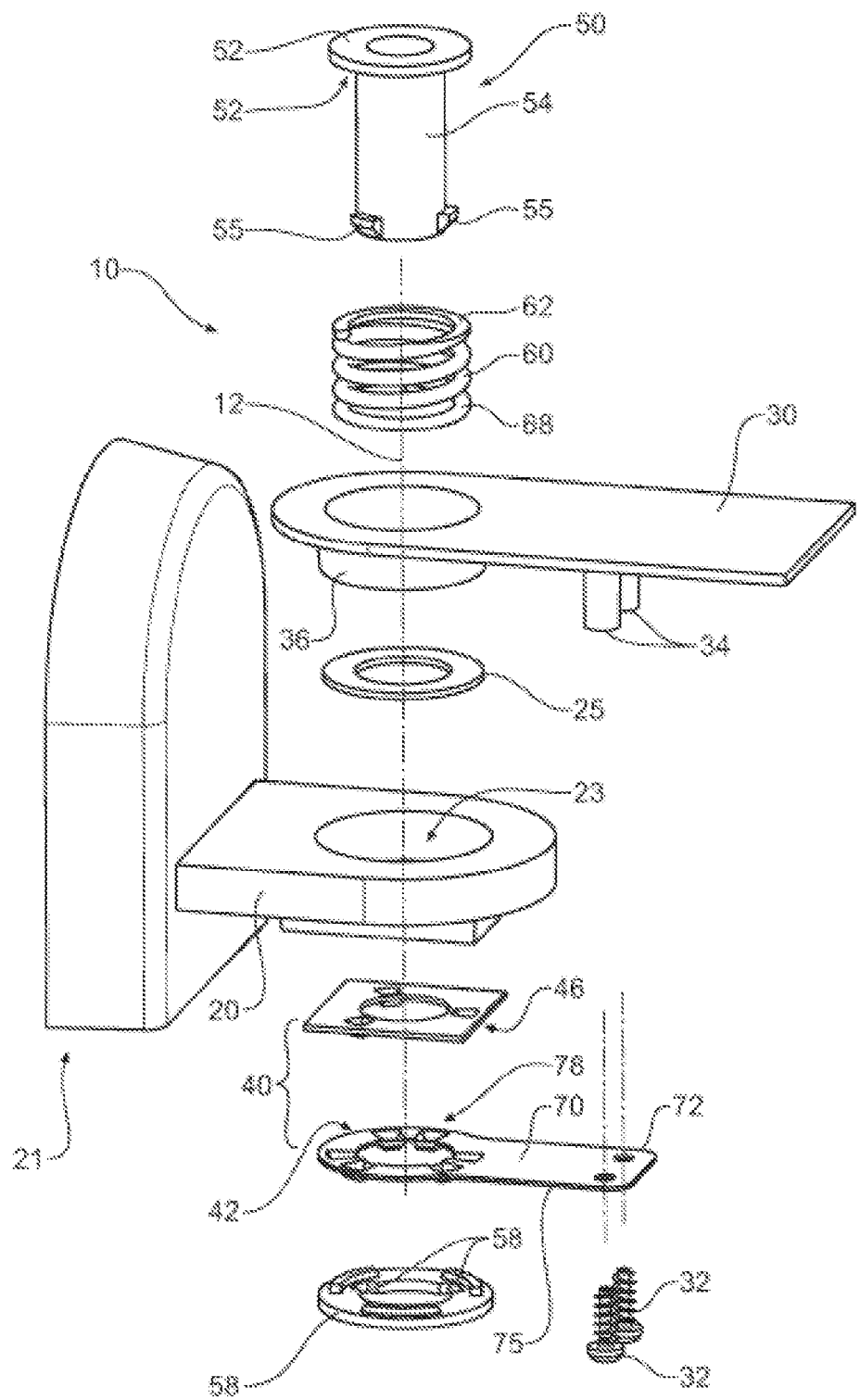
FIG. 7 is similar to FIG. 1 but shows an exploded isometric view of a pivot mechanism according to an alternative embodiment of the invention.
Figure 8:
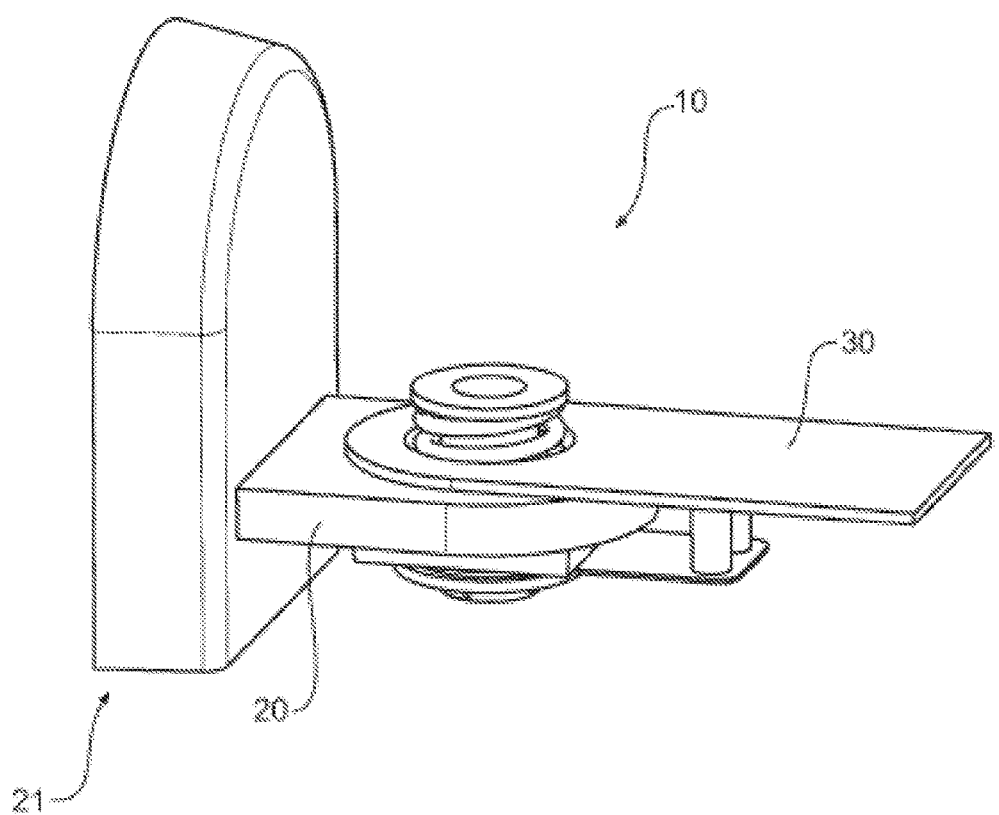
FIG. 8 is a similar view to FIG. 2 but shows an isometric view of the pivot mechanism of FIG. 7.
Figure 9A:
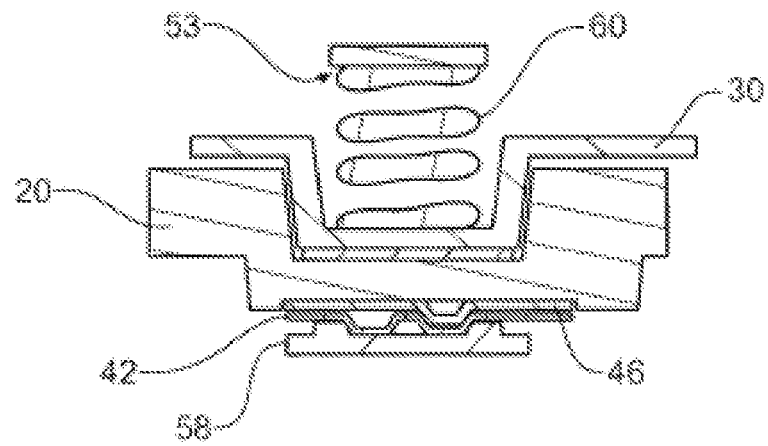
FIGS. 9A and 9B are cross-sectional views of the pivot mechanism shown in FIGS. 7 and 8 showing the pivot mechanism in a deployed or drive position and out of detent position respectively.
Figure 9B:
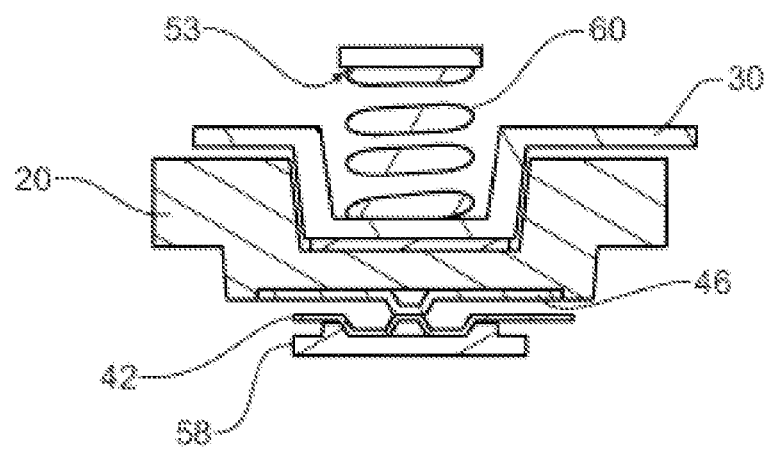

The detent member support arm 70 is flexible, allowing the first set of detent features 42 to move axially away from the second set of detent features 46 into the position shown in FIG. 3B. The detent member support arm 70 is, however, relatively inflexible against rotational movement with respect to the case frame 30. The progressive axial movement of the support arm 70 is shown from FIGS. 5A5A, 5B and 5C, departing the drive detent, to FIGS. 6A, 6B and 6d, which show the relative positions out of the detent.

The spring force acting on the detent 40 equals the spring force clamping the case frame portion 30 to the base frame portion 20. This holds true in the detent position and in the out of detent position.

In other embodiments, not shown, the first and second detent members 42 and 46 may be swapped around such that the first set of detent features 42 sits on a support arm that allows radial movement with respect to the base frame portion 20 and the second set of detent features 46 may be fixed to the case frame 30.

Referring again to FIG. 1, a travel limiting projection 80 and a travel limiting recess 82 is shown. The travel limiting projection 80 is fixed with respect to the base frame portion 20 and the travel limiting recess 82 is fixed with respect to the case frame portion 30. In other embodiments, not shown, alternative travel limiting features may be used. Travel limiting features may limit the rotational travel of the case frame (and hence the mirror head) with respect to the base frame (and hence the vehicle) according to the specifications for the particular vehicle.

The spring tie 50 is splined to the base frame portion 20 by spline projections 57, most clearly shown in FIG. 1, that are received by cut outs 59 that are most clearly shown in the cross-sectional view of FIG. 4D. By fixing the spring tie 50 against rotation with respect to the base frame 20, a wiring harness 90 can be routed from the base frame portion 20 into the spring tie 50 and then out into the mirror case supported by the mirror case frame portion 30, as is best illustrated in the cross-sectional view of FIG. 4D. The spring tie 50 illustrated in FIG. 4D provides for lateral entry of the wiring harness 90 into the spring tie tube 54. In an alternative arrangement the spring tie 50 has simple straight-though internal bore that allows straight-through routing of the wiring harness 90 through the spring tie tube 54.

Referring now to FIGS. 7, 8, 9A and 9B, an alternative embodiment of the invention is shown. With this embodiment of the invention, the spring tie 50 is not splined against rotation with respect to the base frame portion 20. In particular applications, the embodiment shown in FIGS. 7, 8, 9A and 9B may be used.

Figure 10:
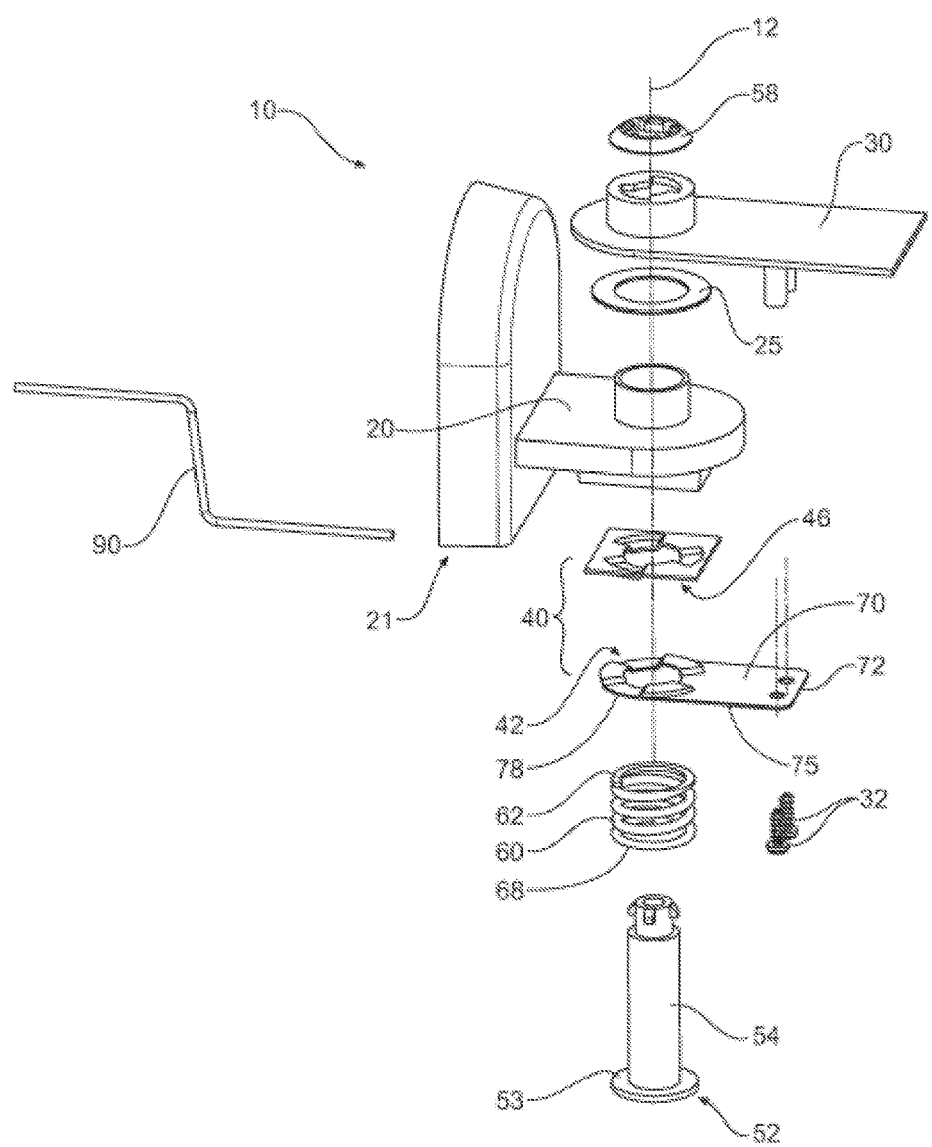
FIG. 10 is a similar view to FIGS. 1 and 7 but shows an exploded isometric view of a pivot mechanism according to a further alternative embodiment of the invention.

Referring to FIG. 10, an alternative embodiment of the invention is shown. With this embodiment of the invention, the spring 160 is positioned on the opposite side of the first set and second set of detent features as compared to the embodiments shown in FIGS. 1 to 9B.

Figure 11:
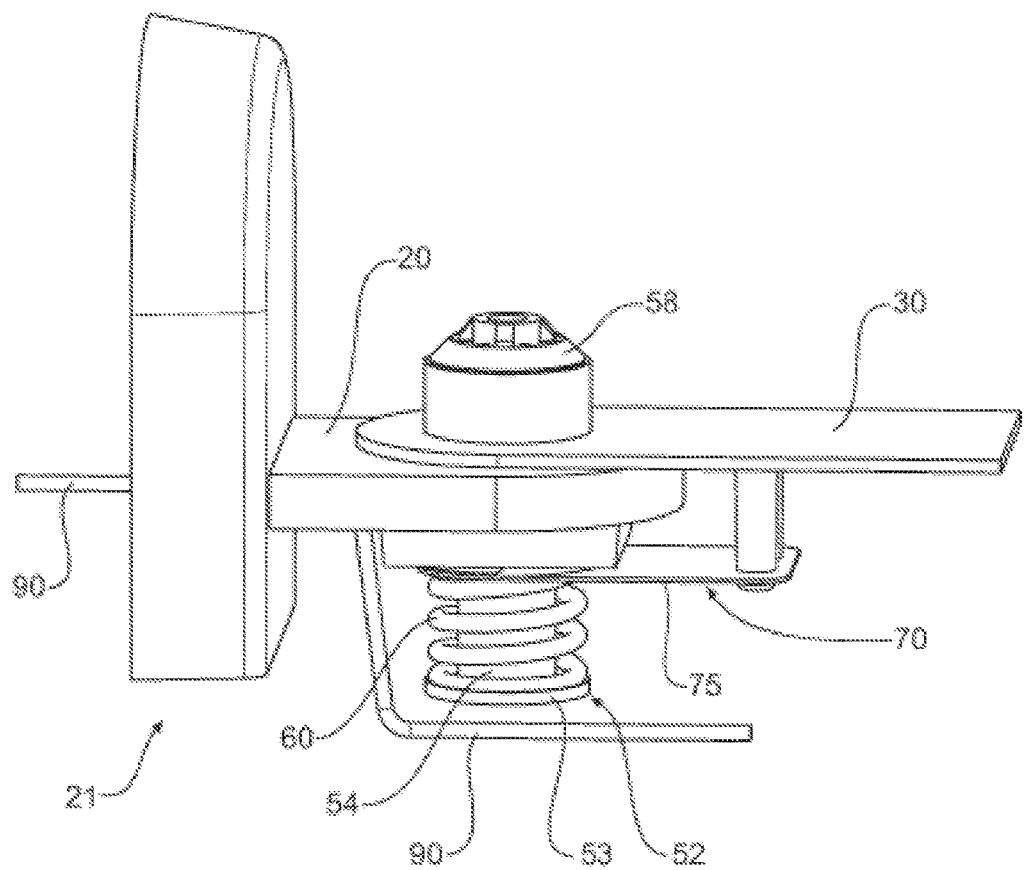
FIG. 11 is an isometric view of a pivot mechanism shown in FIG. 10.

FIGS. 10 and 11 show a pivot mechanism 10 for a vehicle external rear view mirror assembly. The mechanism 10 includes a base frame portion 20 for a vehicle mountable base frame 21. The mechanism 10 also includes a case frame portion 30 mounted to the base frame 20 for rotation about a pivot axis 12. A detent 40, operable between the base frame portion 20 and the case frame 30, is also provided. The detent 40 has an engaged position where the case frame portion 30 is held in a selected position with respect to the base frame portion 20. The detent 40 also has a disengaged position allowing the rotation about the pivot axis 12.

The detent 40 includes a first set of detent features 42 and a second set of detent features 46.

A spring mechanism clamping the case frame portion 30 to the base frame portion 20 and the first set of detent features 42 to the second set of detent features 46 is also provided.

A spring mechanism clamping the case frame portion 30 to the base frame portion 20 in the the first set of detent features 42 to the second set of detent features 46 is also shown in FIGS. 10 and 11. This spring mechanism also forms a part of the pivot mechanism 10.

A support arm 70 having a first attachment end 72 and a second floating end 78 also forms a part of the pivot mechanism 10. The second floating end 78 of the support arm 70 supports the first set of detent features 42. The first set of detent features 42 are fixed against rotation with respect to the support arm 70. However, they are displacable relative to the case frame portion 30 in a direction substantially parallel to the pivot axis 12.

The spring mechanism shown in FIGS. 10 and 11 includes a coil spring 60. In other embodiments of the invention, a coil spring is not used. In such other embodiments, the support arm 70 may function to provide sufficient spring force such that a separate coil spring is not required.

The pivot mechanism 10, as described above and as is illustrated in FIGS. 10 to 14C, produces first and second clamping forces that arise from the combined effect (sum) of a first spring force produced by the compression spring 50 and a second spring force produced by the resilient arm portion 75. In contrast, in other embodiments, such as the embodiment illustrated in FIGS. 15 to 18D, the first and second clamping forces may arise from a spring force produced only by a resilient arm portion 75.

Figure 12A:
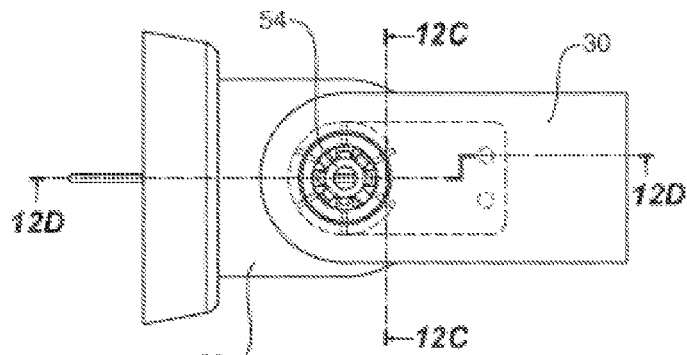
FIG. 12A shows the pivot mechanism of FIGS. 1 and 2 in a top view in the drive detent position.
Figure 12C:
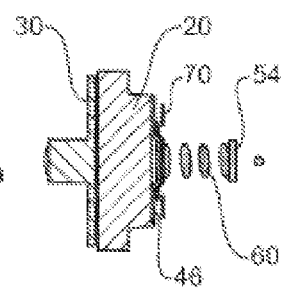
FIG. 12C shows the pivot mechanism of FIGS. 1 and 2 in a cross-sectional view taken through section lines 12C-12C, as indicated on FIG. 12A.
Figure 12B:
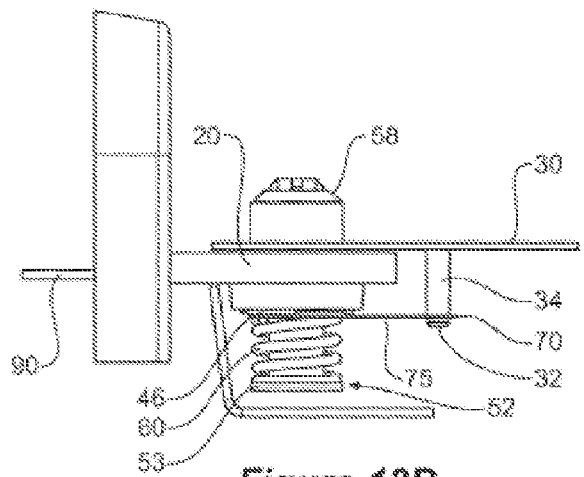
FIG. 12B shows the pivot mechanism of FIGS. 10 and 11 in a side view in the drive detent position.
Figure 12D:
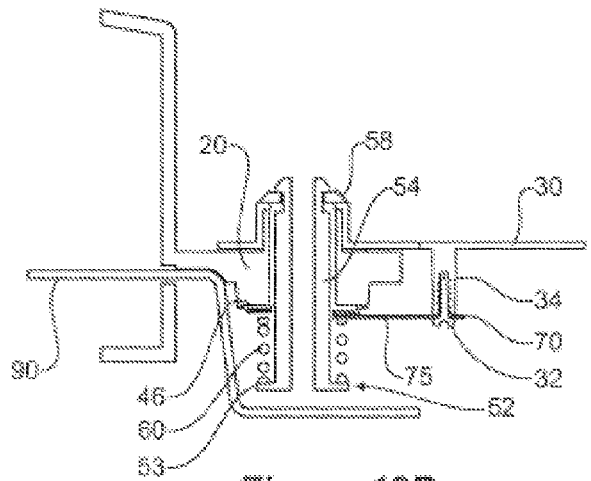
FIG. 12D shows the pivot mechanism of FIGS. 1 and 2 in a cross-sectional view taken through section lines 12D-12D, as shown in FIG. 12A.

Referring now to FIGS. 12A to 12C, it can be seen that the first set of detent features 42 is mounted on the detent member support arm 70. The detent member support arm 70 is attached to screw receiving bosses 34 by screws 32, as is most clearly shown in FIGS. 12B and 12D.

Figure 14A:
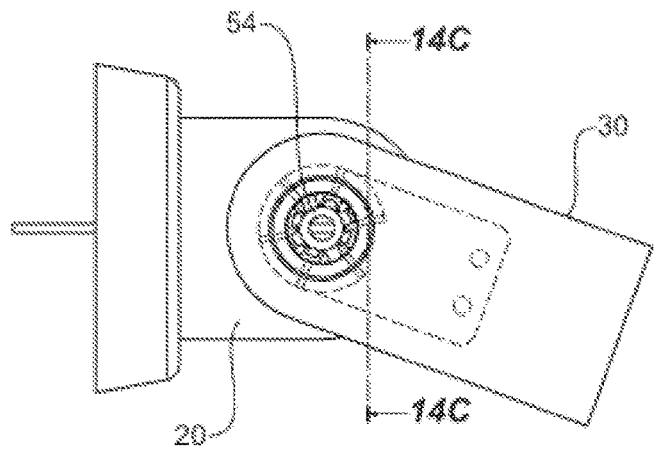
FIG. 14A shows the pivot mechanism of FIGS. 10 and 11 in a top view in the out of detent position.
Figure 14C:
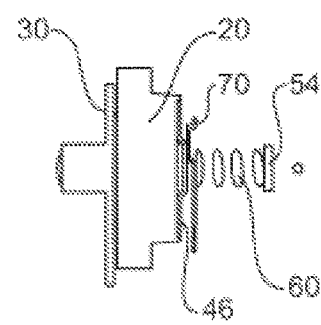
FIG. 14C shows the pivot mechanism of FIGS. 10 and 11 in a cross-sectional view taken through section lines 14C-14C, as indicated on FIG. 14A.
Figure 14B:
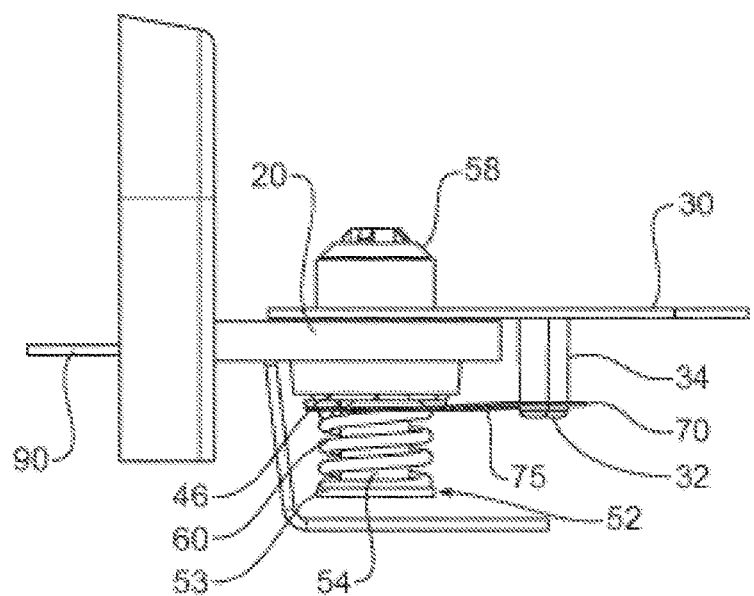
FIG. 14B shows the pivot mechanism of FIGS. 10 and 11 in a side view in the out of detent position.
Figure 15:
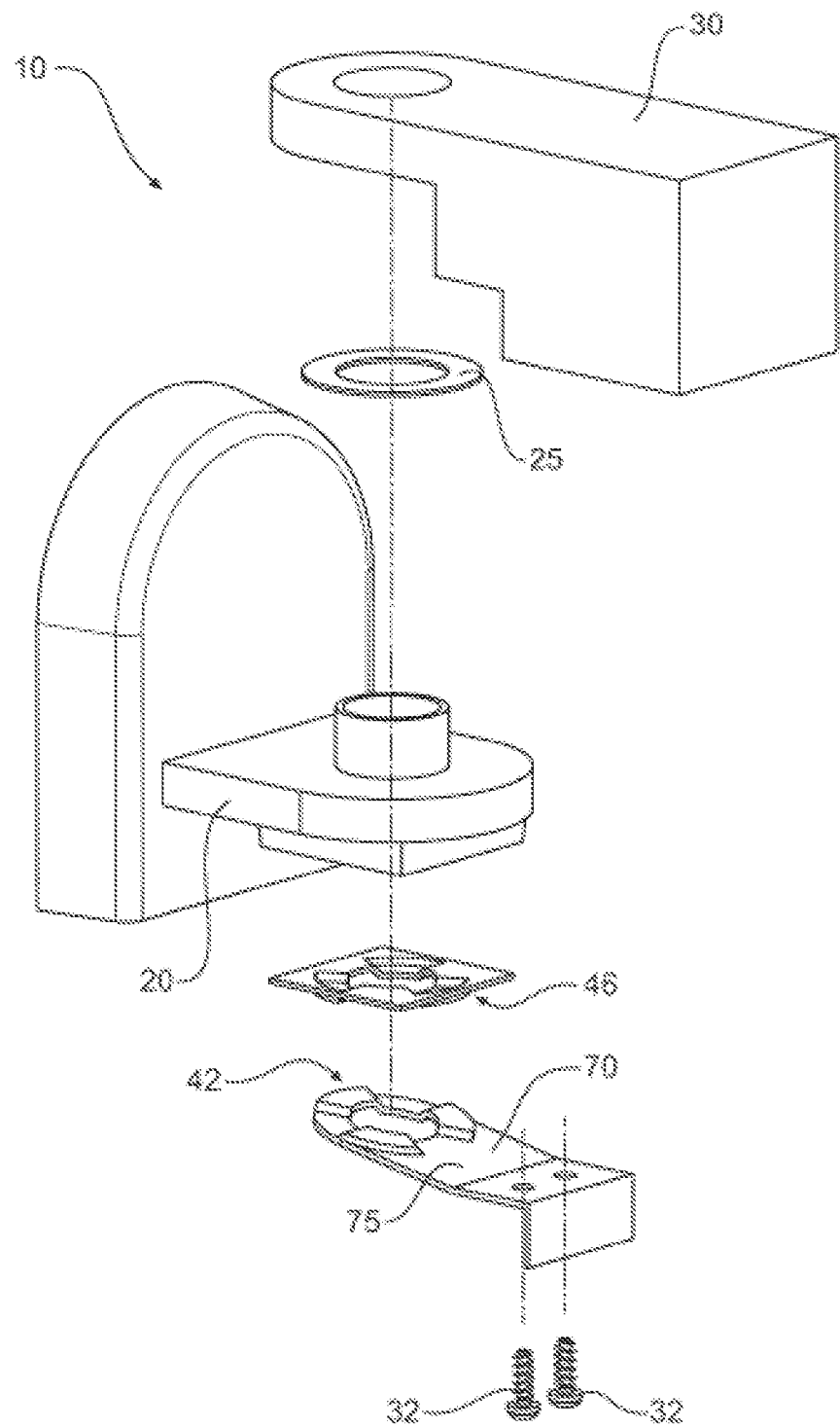
FIG. 15 is a similar view to FIGS. 1, 7 and 10 but shows an exploded isometric view of a pivot mechanism according to a further alternative embodiment of the invention.
Figure 16:
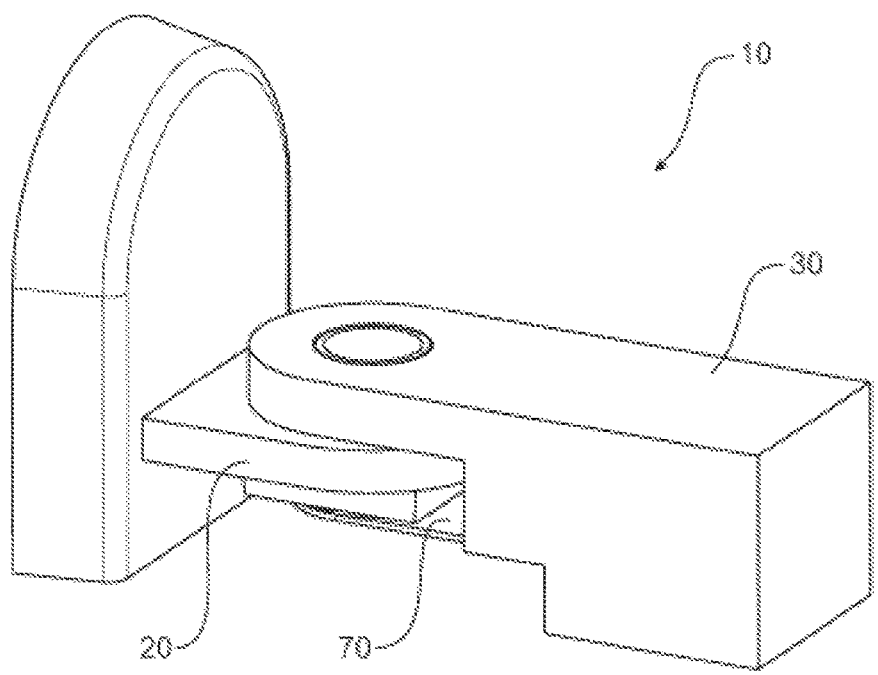
FIG. 16 is an isometric view of a pivot mechanism shown in FIG. 15.
Figure 17:
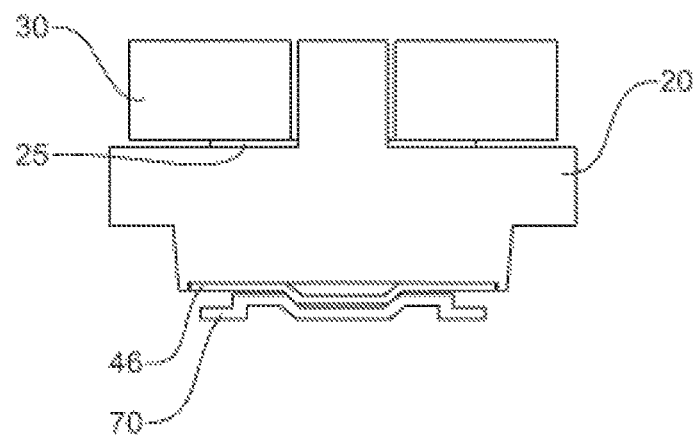
FIG. 17 shows the pivot mechanism of FIG. 16 in the drive detent position, in a cross-sectional view taken through section lines 17-17, as indicated on FIG. 18A.

The detent member support arm is flexible, allowing the first set of detent features 42 to move axially away from the second set of detent features 46 in the position shown in FIG. 14C. The detent member support arm 70 is, however, relatively inflexible against rotational movement with respect to the case frame 30. The progressive axial movement of the support arm 70 is shown from FIGS. 13A to 13C, departing the drive detent, to FIGS. 14A to 14C, which show the relative positions out of the detent.

The spring mechanism provides a first clamping force clamping the case frame portion 30 to the base frame portion 20 and a second clamping force clamping the first set of detent features 42 to the second set of detent features 46, the first and second clamping forces being of equal magnitude. This holds true on the detent position shown in FIGS. 12A to 12D, as well as in the departing detent position shown in FIGS. 13A to 13C and in the out of detent position shown in FIGS. 14A to 14C. The first and second clamping forces are however higher in the disengage position shown in FIGS. 14A to 14C than they are in the engaged position shown in FIGS. 12A to 12D.

In the embodiment shown in FIGS. 10 to 14C, the spring mechanism includes the compression spring 60 and a spring tie 50. The spring tie 50 has a first tie end 52 and a second tie end 58 spaced apart from each other and connected by a tie portion 54. The first spring end 62 bears against the first tie or retaining end 52 of the spring tie 50 and the second spring end 68 bears against the case frame portion 30. The tie portion 54 may be a tube, for instance, as is shown in FIG. 1. Alternatively, the spring tie may be solid. The tie portion 50 passes through the spring 60, as is shown in FIGS. 10 and 11. The second tie end 58 is separable from the tie portion 50 for assembly.

The spring mechanism includes a resilient arm portion 75. The resilient arm portion 75 is located between the first attachment end 72 and the second floating end 78 of the support arm 70.

The support arm 70 and the first set of detent features 42 are formed from a single unitary component, being a pressed sheet of steel so as to form a unitary case plate. In other embodiments, not shown, these components may be separate with a case plate backbone supporting a detent ring for instance.

With each of the pivot mechanism embodiments of the invention described above, the relative axial positions of the base frame portion 20 and the case frame portion 30 remain unchanged from between the engaged position and the disengaged position. This "zero lift" gives reduced and consistent gaps between parts of the mirror assembly. This results in: aesthetic improvement and reduces wind noise. The overall vertical package space required for the pivot mechanisms of the invention tend to be reduced. This provides further benefits in overall mirror assembly design.

In each of the embodiments described above, a spring tie 50 is employed. The spring tie may conveniently take the form of a tube as is illustrated in the FIGS. 1 and 7 for instance. Its primary function however is to act as a tie in transmitting a tension force, the force coming from the spring assembly. Therefore, in other embodiments of the invention, the spring tie need not be a tube, but may take alternative forms.

Now turning to FIGS. 15 to 18D, a further embodiment of the invention is shown. With this embodiment of the invention, no coil spring is required. Instead, the first and second clamping forces referred to above are generated by the resilient arm portion 75 of the support arm 70. FIGS. 18A, 18B and 18C show the support arm 70 and the resilient arm portion 75 in an engaged condition where the case frame portion 30 is held in a selected position with respect to the base frame portion 20.

Figure 18A:
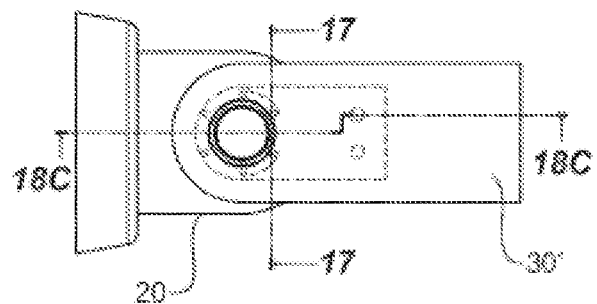
FIG. 18A shows the pivot mechanism of FIG. 16 in a top view in a position departing the drive detent.
Figure 18B:
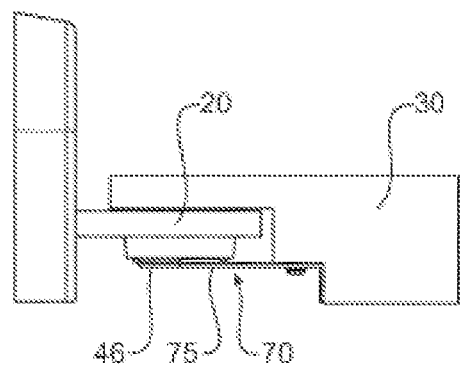
FIG. 18B shows the pivot mechanism of FIG. 16 in a side view in a position departing the drive detent.
Figure 18C:
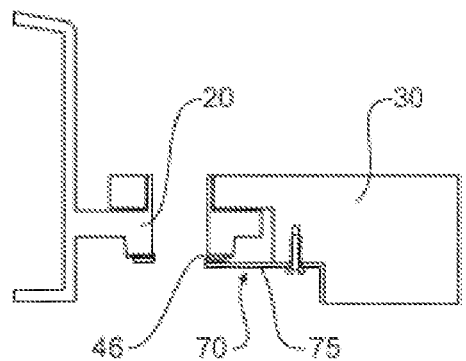
FIG. 18C shows the pivot mechanism of FIG. 16 in a cross-sectional view taken through section lines 18C-18C, as indicated on FIG. 18A.
Figure 18D:
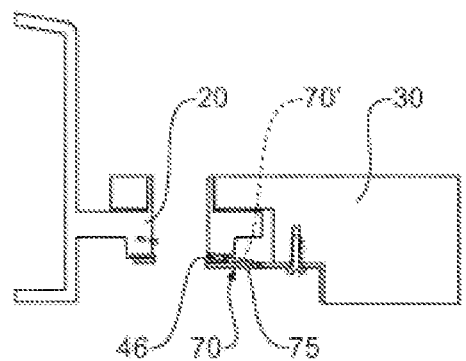

FIG. 18D shows the support arm 70' in dotted outline, the dotted outline representing the position the arm 70 would be in if not displaced downwards by the assembly. The resilient arm portion 75 is responsible for the spring force generated by the arm 70.

Figure 19:
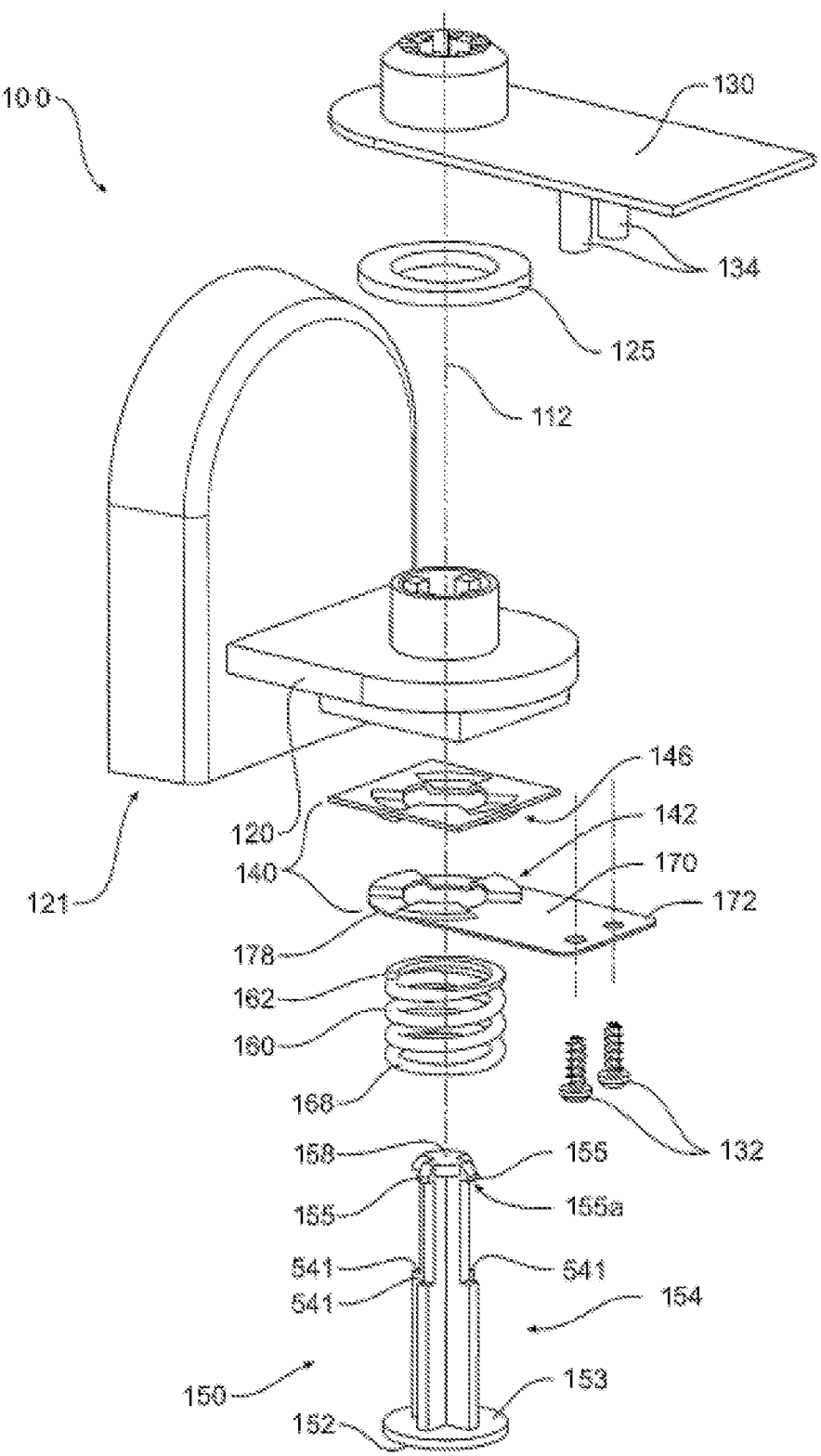
FIG. 19 is an exploded isometric view of a pivot mechanism according to another embodiment of the invention looking from above.
Figure 20:
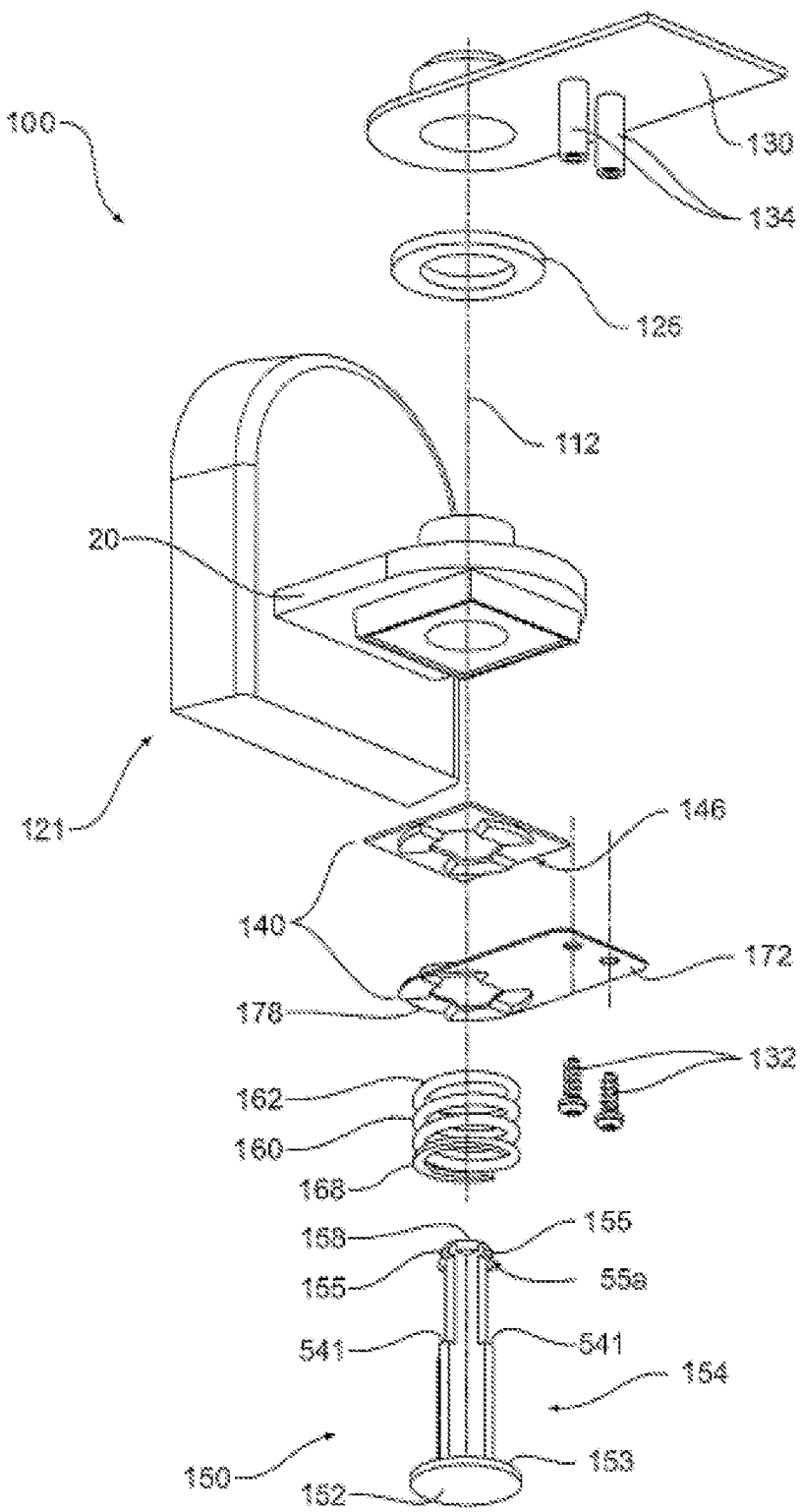
FIG. 20 is an exploded isometric view of the pivot mechanism shown in FIG. 1 looking from below.
Figure 21:
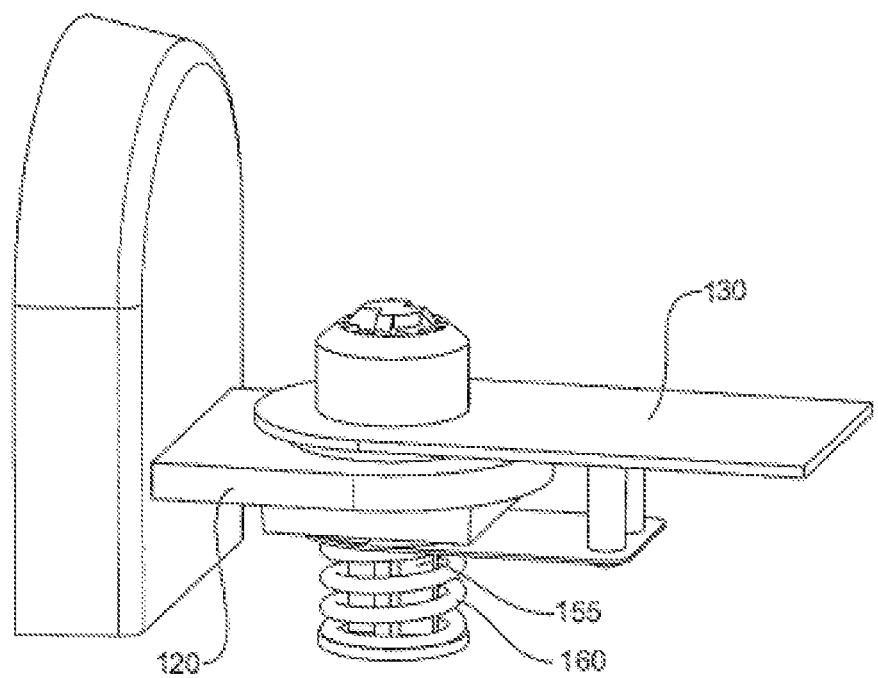
FIGS. 21, 22 and 23 are isometric, side and plan views respectively of the pivot mechanism shown in FIGS. 19 and 20, with the pivot mechanism in a deployed or drive position.

Referring now to FIGS. 19 and 20, there is shown a pivot mechanism 100 for a vehicle external rear view device assembly according to another embodiment of the invention. The mechanism includes a base frame portion 120 for a vehicle-mountable base frame 121 and a case frame portion 130 mounted to the base frame portion 120 for rotation about a pivot axis 112. The base frame portion 120 may be integral with a base frame, or may be a separate component attached to, or attachable to, other base frame portions. Similarly, the case frame portion 130 may be integral with a case frame, or may be a separate component attached to, or attachable to, other case frame portions.

Typically, the case frame supports a mirror and a decorative case housing. The case frame, mirror and decorative housing are all rotatable together with respect to the base frame, which is typically fixed to a vehicle door. Equally, the case frame may support an alternative rear view device in the form of a camera.

A detent 140 operable between the base frame portion 120 and the case frame portion 130 is provided. The detent 140 has an engaged position shown in FIGS. 21 to 38. In this engaged position, the case frame portion 130 is held in a selected position with respect to the base frame portion 120.

As can be seen from FIGS. 19 and 20, the detent 140 includes a first set of detent features 142 and a second set of detent features 146. The first set of detent features 142 are fixed against rotation with respect to the case frame 130 about the pivot axis 112 but is axially movable with respect to both the case frame portion 130 and the base frame portion 120. The second set of detent features 146 are fixed against rotation with respect to the base frame portion 120. A spring assembly including a spring retainer or spring tie 150 and a spring 160 clamps the case frame portion 130 to the base frame portion 120 and also clamps the first set of detent features 142 to the second set of detent features 146.

The pivot mechanism 110 also includes a detent member support arm 170, having a first attachment end 172 and a second floating end 178. The first attachment end 172 is mounted to the case frame portion 130 for rotation therewith. The second floating end 178 is displaceable relative to the case frame portion 30 in a direction substantially parallel to the pivot axis 112.

The spring assembly includes a spring retainer or spring tie 150 having a first retaining end 152 and a second retaining end 158, the first and second retaining ends 152, 158 spaced apart from each other, and a compression spring 160 having a first spring end 162 and a second spring end 168. The spring assembly is disposed in compression between a flange 153 of the first retaining end 152 of the spring tie 150 and the base frame 120, as is most clearly shown in the cross-sectional views of FIGS. 24 and 25A read together with the exploded view of FIG. 19. The first spring end 162 bears against the second floating end 178 of the support arm and the second spring end 168 bears against the first retaining end 152 of the spring tie 150.

The spring tie 150 has a first tie end 152 and a second tie end 158. The first and second tie ends 152, 158 are spaced apart from each other and are connected by a tie shaft 154. The tie shaft 154 passes through the spring 160, as can be seen in the exploded view of FIG. 19 and in isometric FIG. 21.

Figure 22:
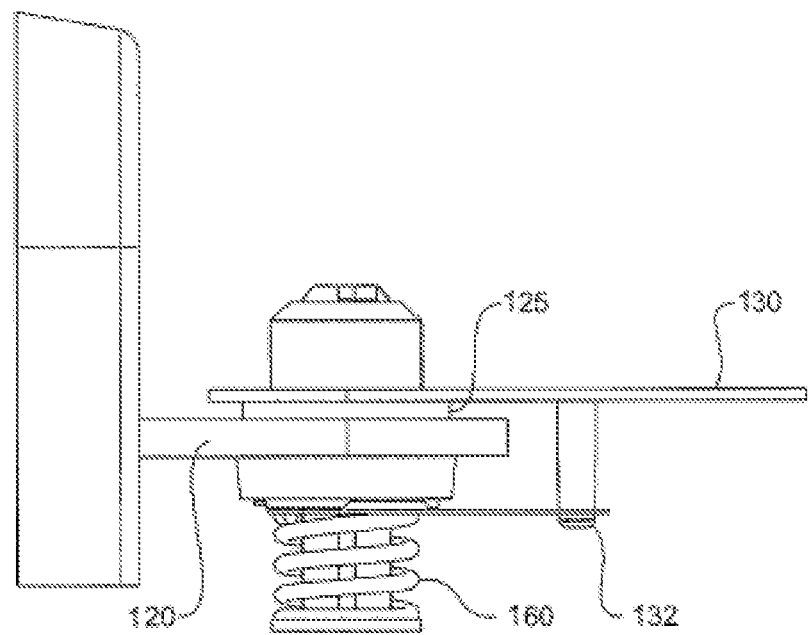

A bearing washer 125 is disposed between the case frame portion 130 and the base frame portion 120, as is most clearly shown in FIGS. 19 and 22.

Figure 23:
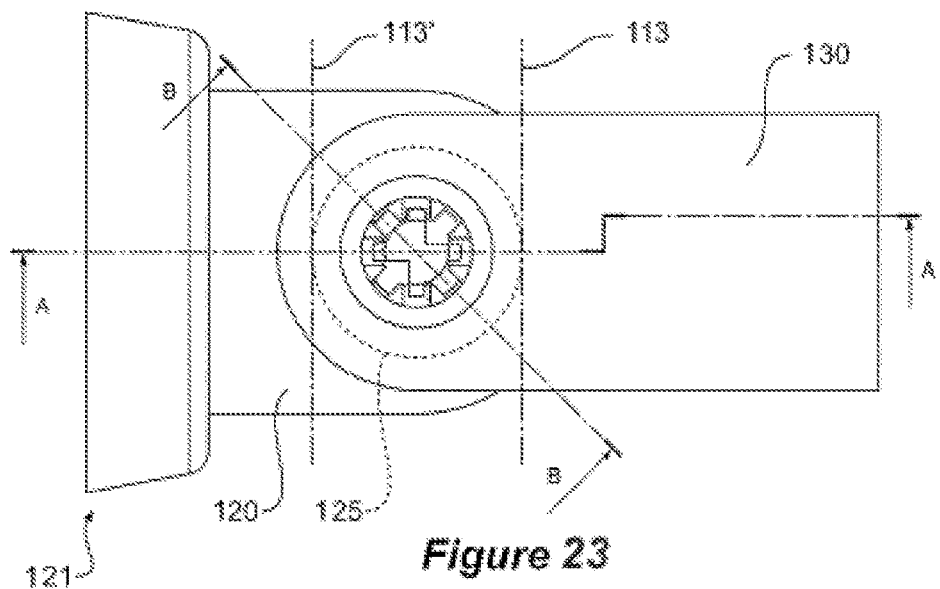
Figure 24:
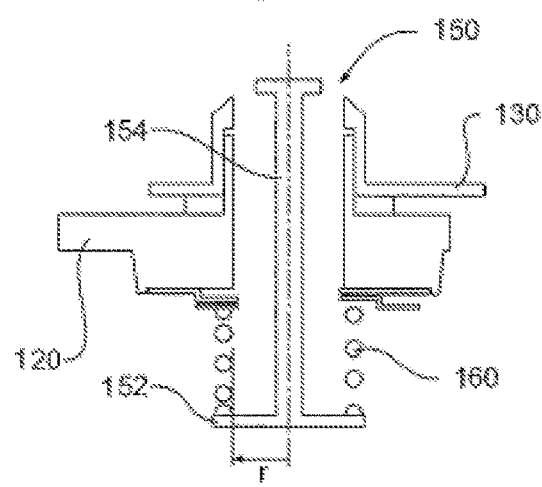
FIG. 24 is a cross-sectional view through section lines B-B shown on FIG. 23.

Now referring to the plan view of FIG. 23, and the cross-sectional view of FIG. 24 taken through section lines B-B as shown on FIG. 23, it can be seen that the spring 160 has a spring internal radius r.

Now referring to FIG. 25A, a further cross-sectional view taken through sectional lines A-A as shown on FIG. 23, it can be seen that the spring tie shaft 154 of the spring tie 150 passes through the spring 160 and sits within the spring internal radius r. It can also be seen that the spring tie shaft includes a spring tie reaction feature in the form of four spring tie reaction surfaces 541, most clearly shown in FIGS. 19 and 25B (FIG. 25B being a magnified view of the area indicated by circle C7 on FIG. 25A). The spring tie reaction circle C7 surfaces 541 are generally slightly spaced from corresponding case frame surfaces 201, as can be seen in FIG. 25B. However, when the pivot mechanism 100 is in its deployed position, as is shown in FIG. 23, external forces applied at arrow F1 shown on FIG. 26A, induced by a person leaning on the mirror case, or camera case, for instance, will create a torque that will be resisted by the spring tie reaction features in the form of the spring tie reaction surfaces 541 illustrated in the magnified cross-sectional view of FIG. 25B. More specifically, a torque applied to the case frame portion 130 about an axis orthogonal to the pivot axis 112 by an external down force F1 is resisted by the spring tie reaction features in the form of the spring tie reaction surfaces 541. This is illustrated in FIG. 26A and in the magnified FIGS. 26B and 26C. An example of an axis orthogonal to the pivot axis 112 is axis 113 illustrated on FIG. 23.

In addition to the resistance offered by the spring tie reaction surfaces 541 as shown in FIGS. 26A and 26B, a reaction force is induced at the bearing washer 125 as is illustrated by arrow R I shown on FIG. 26B. A small gap, as indicated by arrow G1 on FIG. 26C, may open up as a down force F1 is applied.

In a situation where an up force by indicated by arrow F2 on FIG. 26A is applied to the rear vision device case (rather than a down force), the resultant torque acting on the case frame portion 130 about an axis 113' (shown in FIG. 23) orthogonal to the pivot axis 112 is again resisted by the spring tie reaction surfaces 541.

Returning to FIG. 19, it can be seen that the spring tie reaction surfaces 541 are circumferentially spaced apart around the spring tie shaft 154.

Turning again to FIGS. 25A, 25B, 26A and 26B, it can be seen that the spring tie reaction surfaces 541 are located radially inboard of the internal radius r of the compression spring 160.

Figures 27, 28:
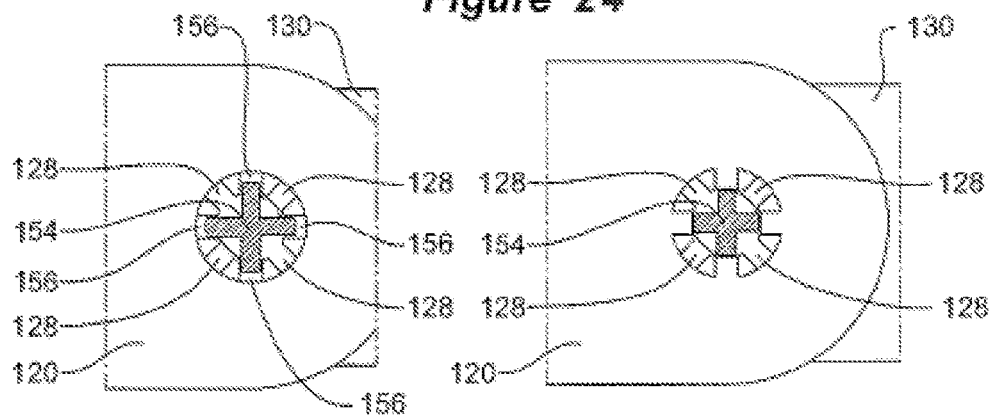
FIGS. 27 and 28 are cross-sectional views through section lines C-C and D-D respectively as shown on FIG. 25A.

The cross-sectional views of FIGS. 27 and 28, taken through section lines C-C and D-D respectively, shown on FIG. 25A, show how the spring tie reaction surfaces 541 (shown in FIG. 25B) are captive when the case frame portion 30 is in its deployed position. Referring to FIG. 27, it can be seen that voids 128 are provided to facilitate assembly. When the pivot tie shaft 154 is rotated 45 degrees from the position shown in FIG. 27, the spring tie reaction surfaces 541 can move through the voids 128, whereas in the position shown in FIG. 27, the underside surface 155a (shown in FIG. 19) of the ramped projections 155 sit within recesses 156. Turning to FIGS. 19 and 20, it can be seen that the first set of detent features 142 is mounted on a detent member support arm 170. The detent member support arm 170 is attached to screw receiving bosses 134 by screws 132, as is most clearly shown in FIGS. 19 and 22.

The detent member support arm 170 is flexible, allowing the first set of detent features 142 to move axially away from the second set of detent features 146. The detent member support arm 170 is, however, relatively inflexible against rotational movement with respect to the case frame 130.

In other embodiments, not shown, the first and second detent members 142 and 146 may be swapped around such that the first set of detent features 142 sits on a support arm that allows radial movement with respect to the base frame portion 120 and the second set of detent features 146 may be fixed to the case frame 130.

Figure 29:
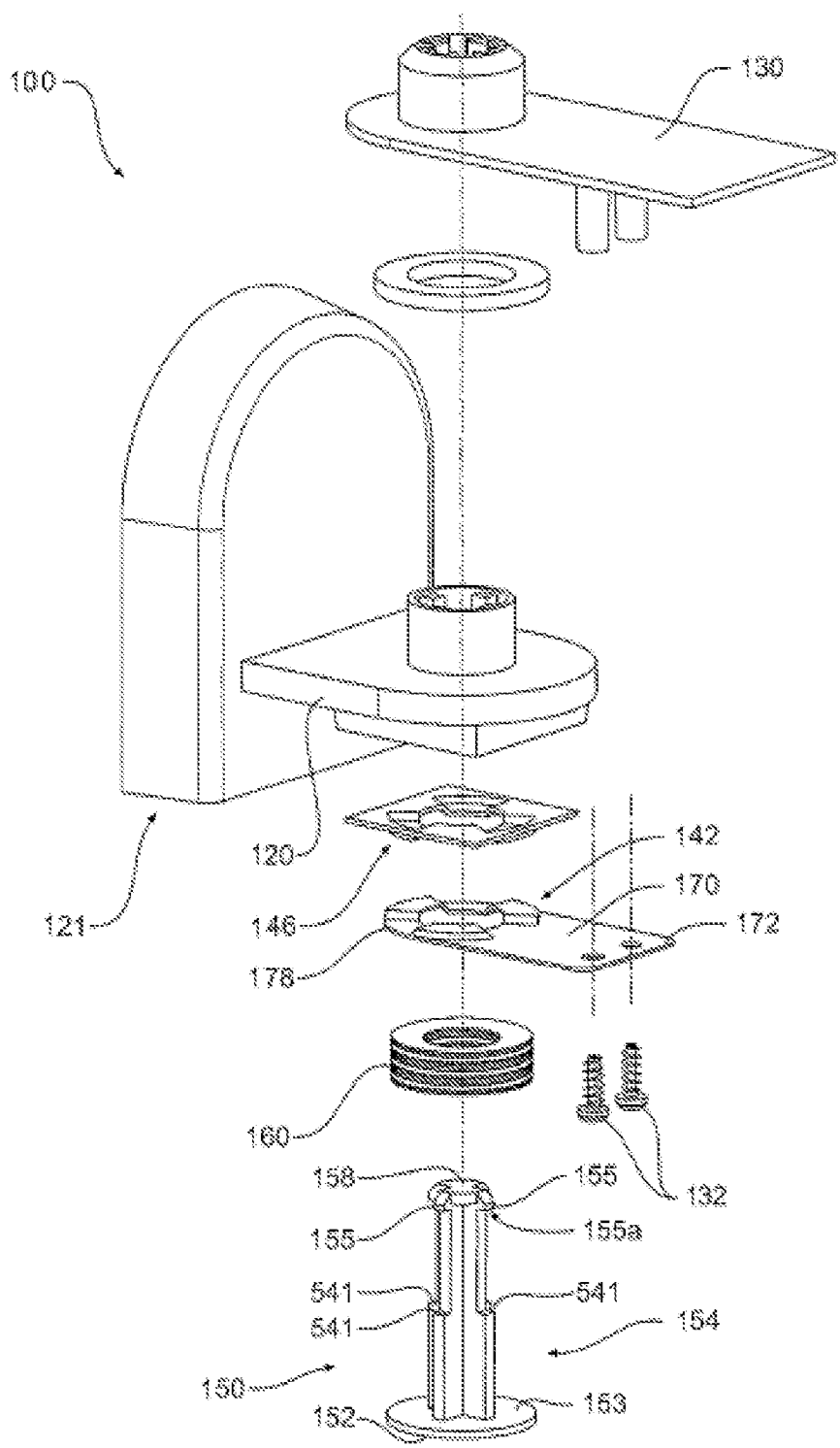
FIG. 29 is an exploded isometric view of a pivot mechanism according to another embodiment of the invention looking from above.
Figure 30:
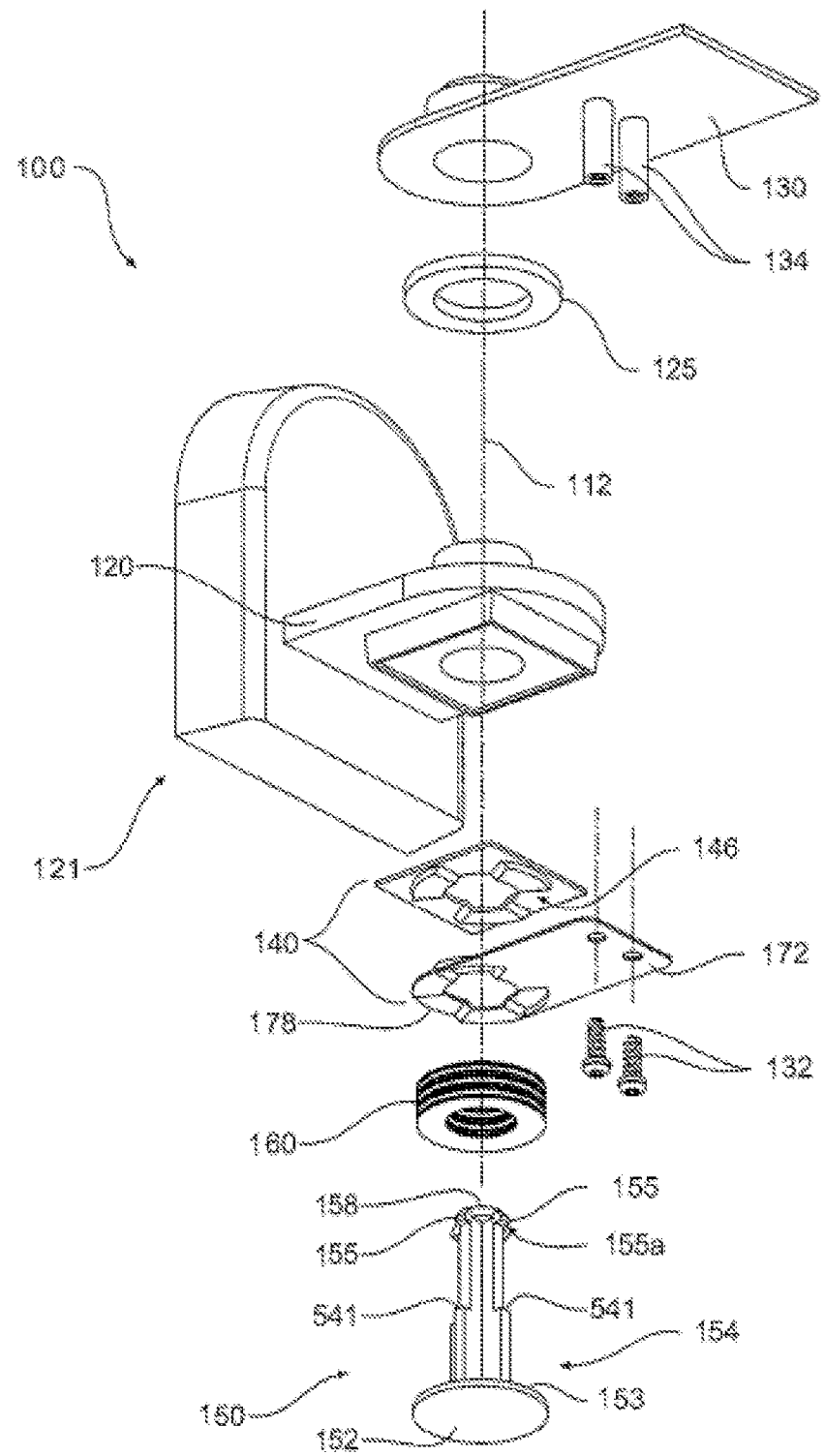
FIG. 30 is an exploded isometric view of the pivot mechanism shown in FIG. 29 looking from below.
Figure 31:
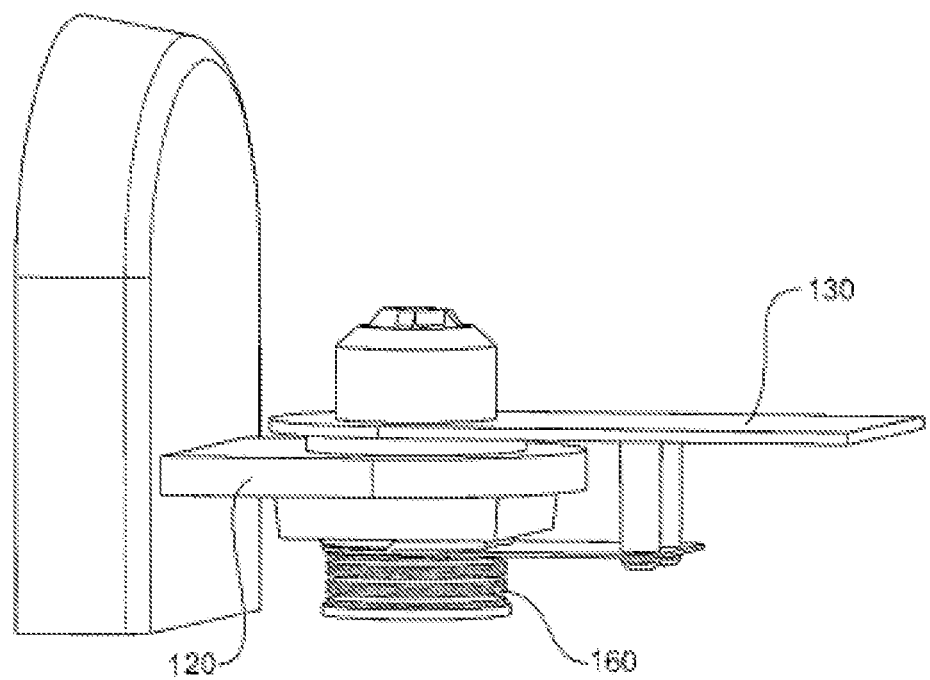
Figure 32:
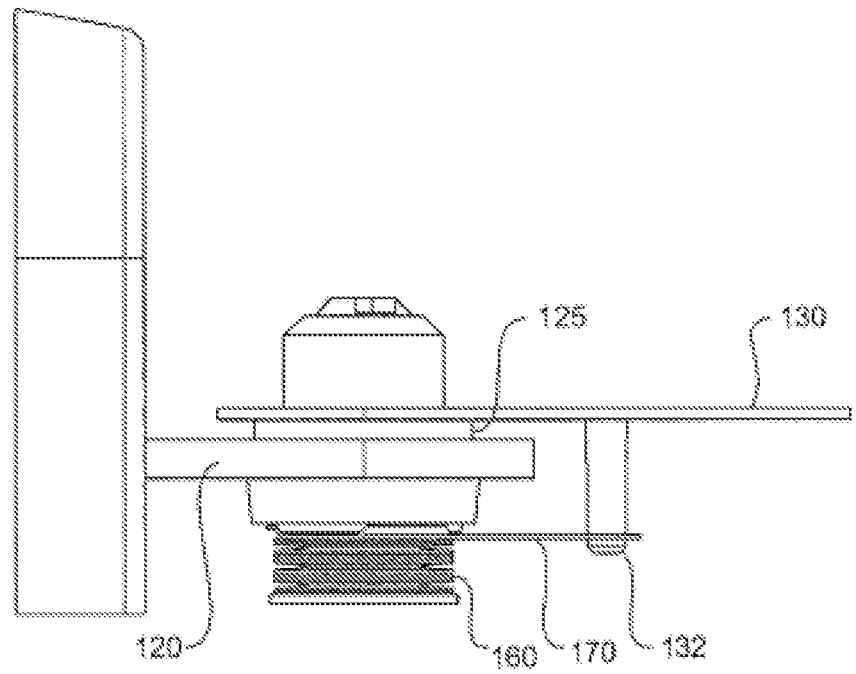
Figure 35:
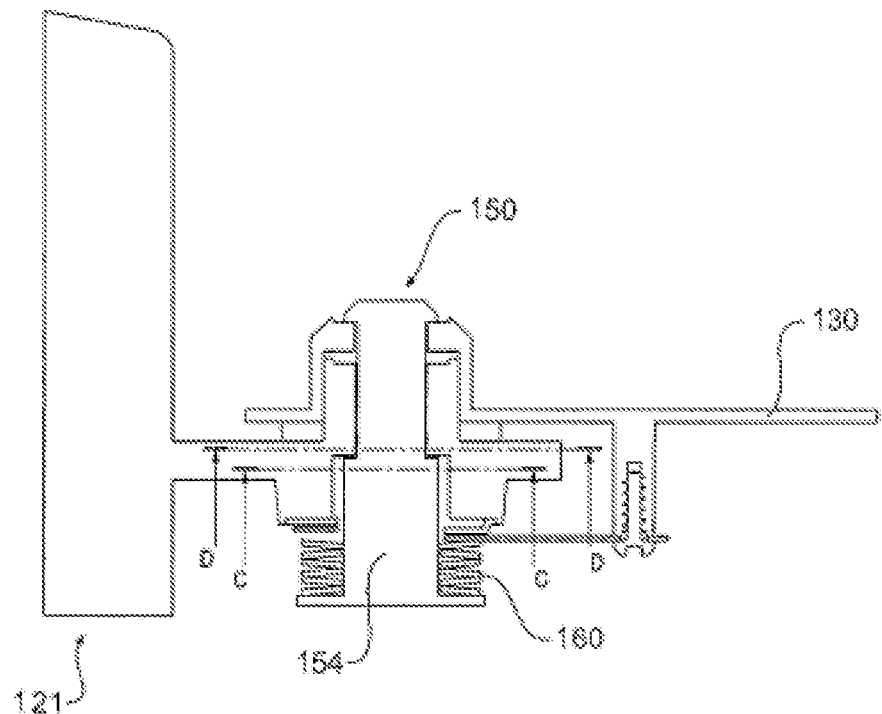
FIG. 35 is a cross-sectional view through section lines A-A shown on FIG. 33 while the pivot mechanism is in its normal drive position.
Figure 36:
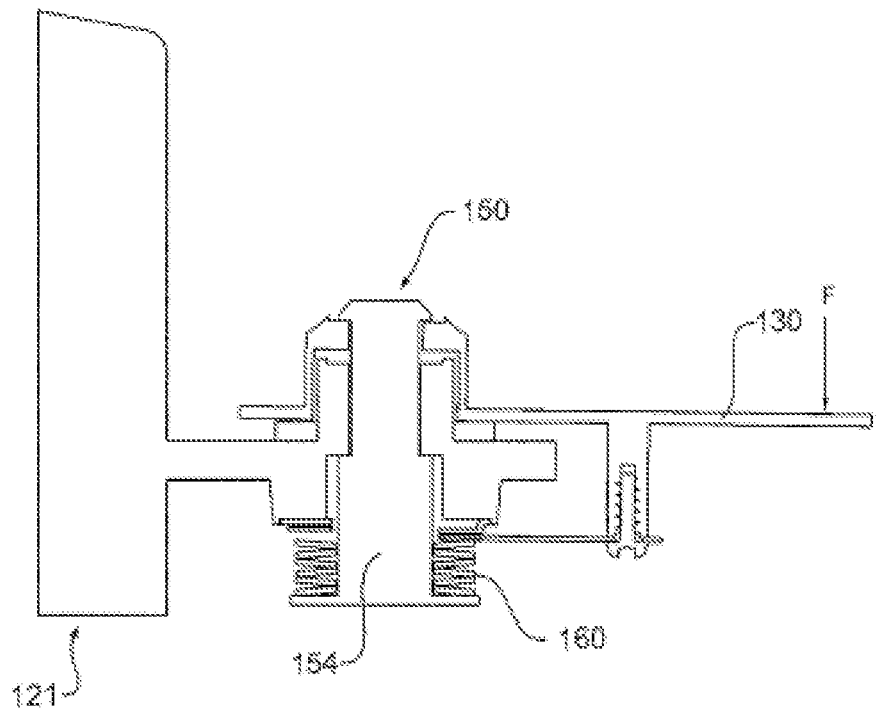
FIG. 36 is a cross-sectional view through section lines A-A shown on FIG. 33 with a down force applied to the mirror head, the down force inducing a torque about an axis orthogonal to the pivot axis.

Referring now to FIGS. 29 and 30, there is shown a pivot mechanism 100 for a vehicle external rear view device assembly according to a second embodiment of the invention. This embodiment of the invention is similar to that shown in FIGS. 19 and 20 and FIGS. 21 to 28, but the coil spring 160 of the embodiment of the invention is replaced by disc springs or Belleville washers 160, as indicated in FIGS. 29 and 30. In other respects, this embodiment is identical to that of the earlier embodiment. In further embodiments, other compression springs such as wave springs may be used.

Figure 40:
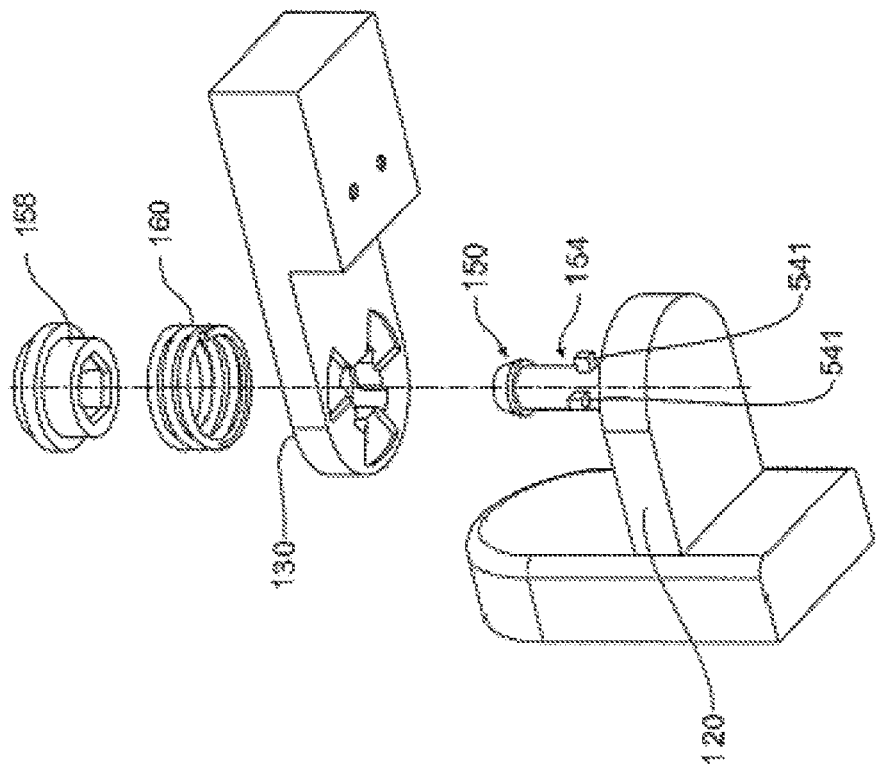
FIG. 40 is an exploded isometric view of the pivot mechanism shown in FIG. 39 looking from below.
Figure 39:
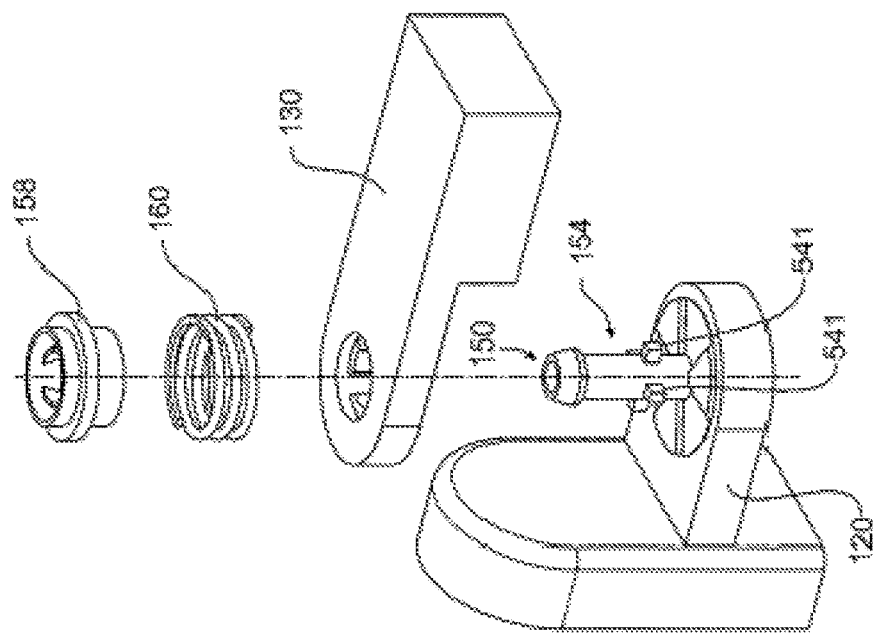
FIG. 39 is an exploded isometric view of a pivot mechanism according to a yet another embodiment of the invention looking from above.
Figure 41:
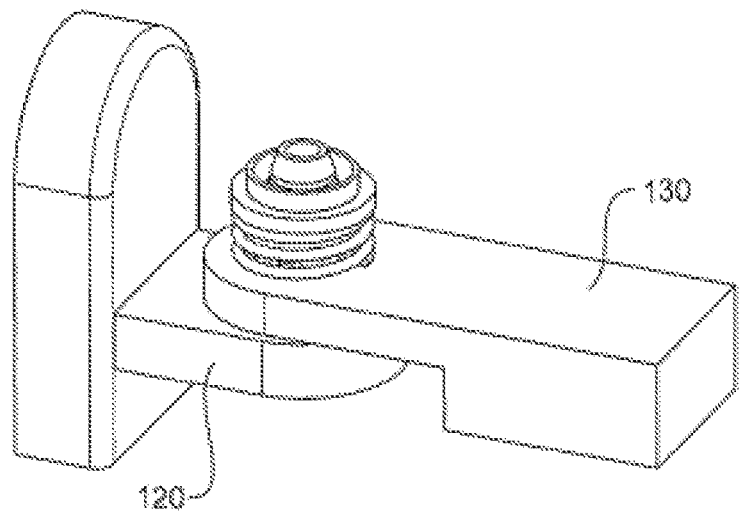
FIGS. 41, 42 and 43 are isometric, side and plan views respectively of the pivot mechanism shown in FIGS. 39 and 40, with the pivot mechanism in a deployed or drive position.
Figure 42:
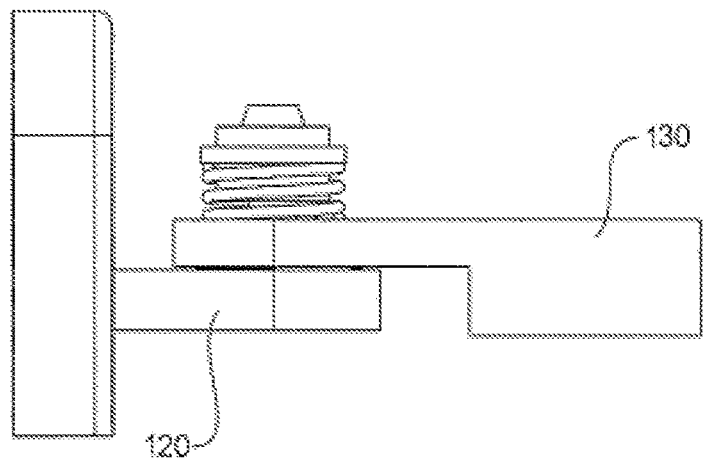
Figure 43:
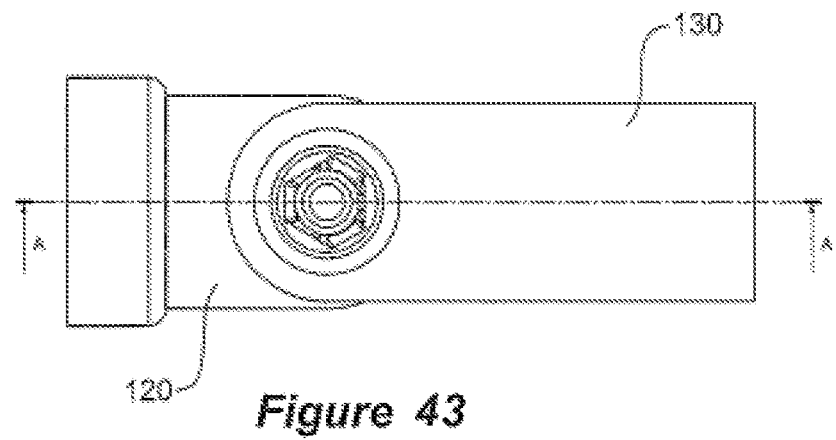
Figure 44A:
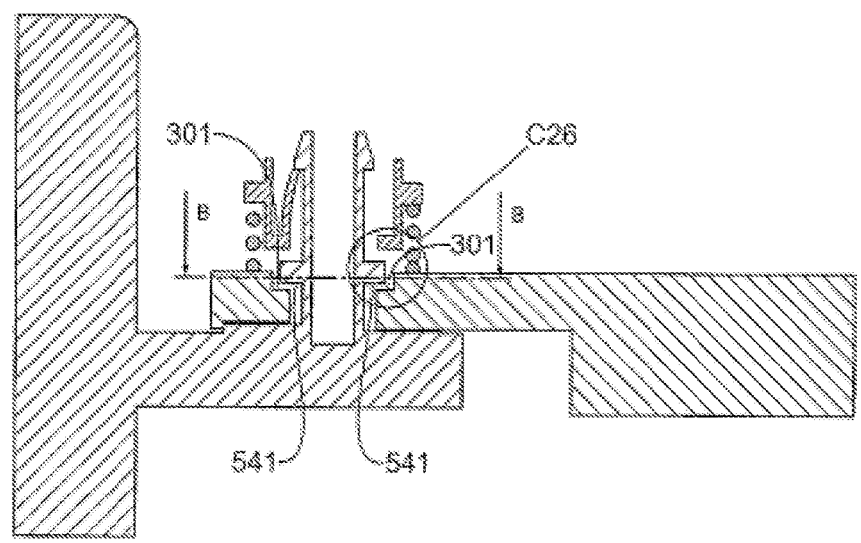
FIG. 44A is a cross-sectional view through section lines A-A shown on FIG. 43 while the pivot mechanism is in its normal drive position.
Figure 44B:
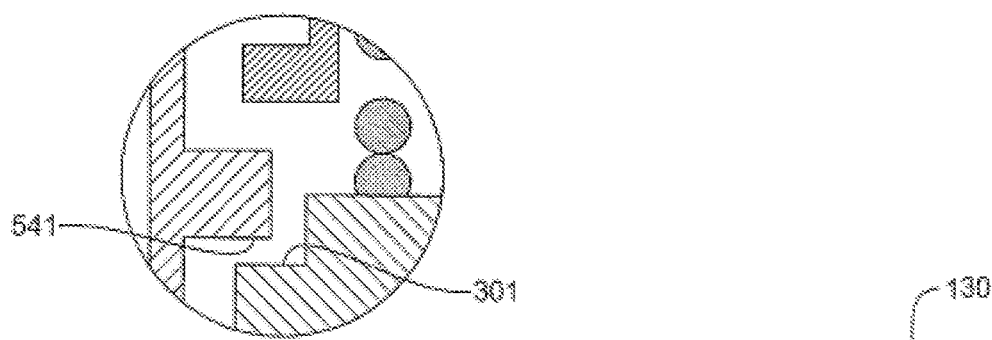
FIG. 44B is a magnified view of the portion of the pivot mechanism indicated by circle C26 on FIG. 44A.
Figure 45:
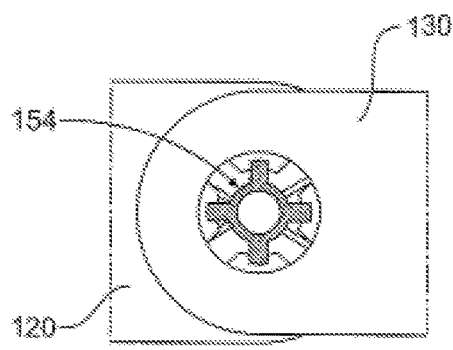
FIG. 45 is a cross-sectional views through section lines B-B shown on FIG. 44.

Now turning to FIGS. 39 and 40, another embodiment of the invention is shown. This embodiment of the invention differs to the previous embodiments of the invention in that the spring tie 150 is connected to or integral with the base frame portion 120. With this embodiment of the invention, the spring tie reaction surfaces 541 face downwards, as is shown in FIGS. 39, 40 and 44. FIG. 44B and FIG. 39C are close up views of the circled portion C26 indicated on FIG. 44A.

Figure 44C:
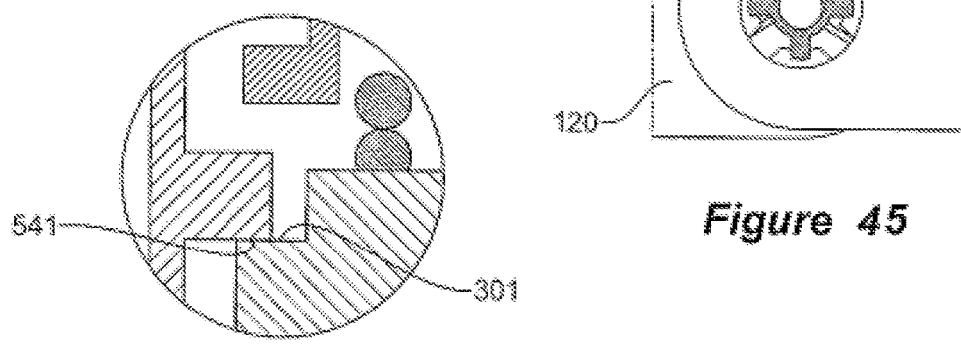
FIG. 44C is a similar view to that of FIG. 44B, but with a down force applied to the mirror head.
Figure 48:
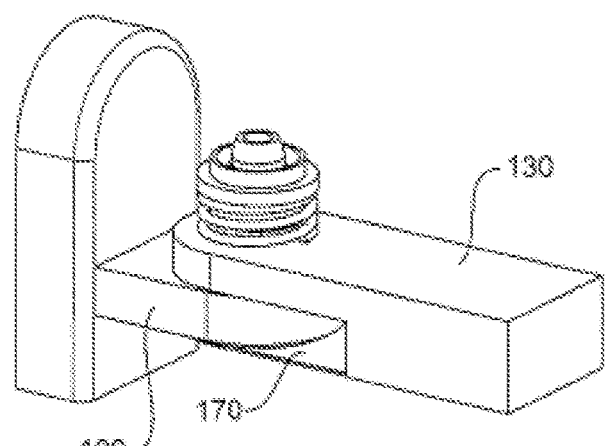
FIGS. 48, 49 and 50A are isometric, side and plan views respectively of the pivot mechanism shown in FIGS. 46 and 47, with the pivot mechanism in a deployed or drive position.
Figure 49:
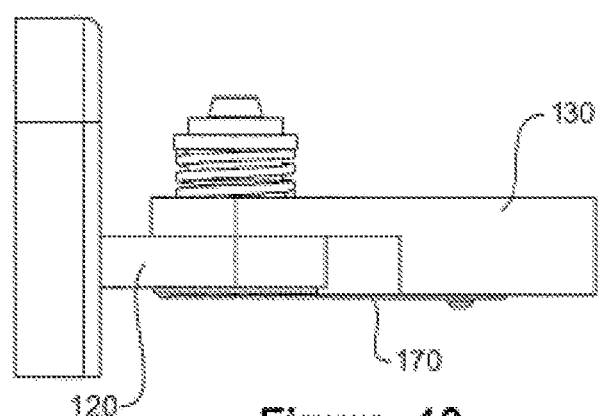
Figure 50A:
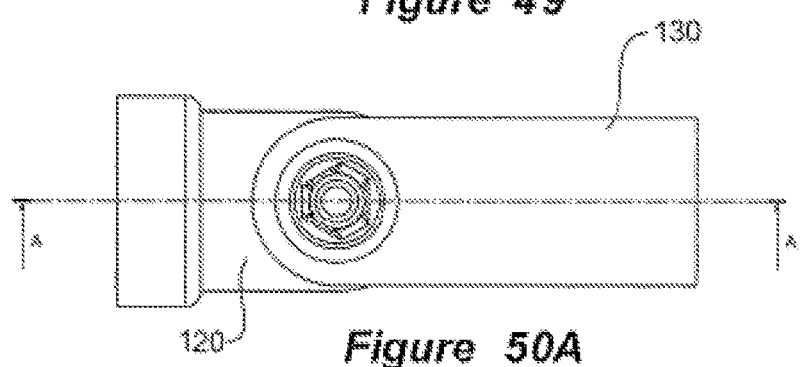
Figure 50B:
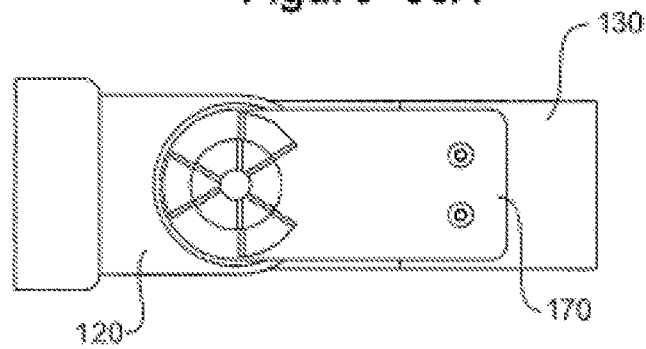
FIG. 50B is an underside view of the pivot mechanism shown in FIGS. 46 and 47.
Figure 51A:
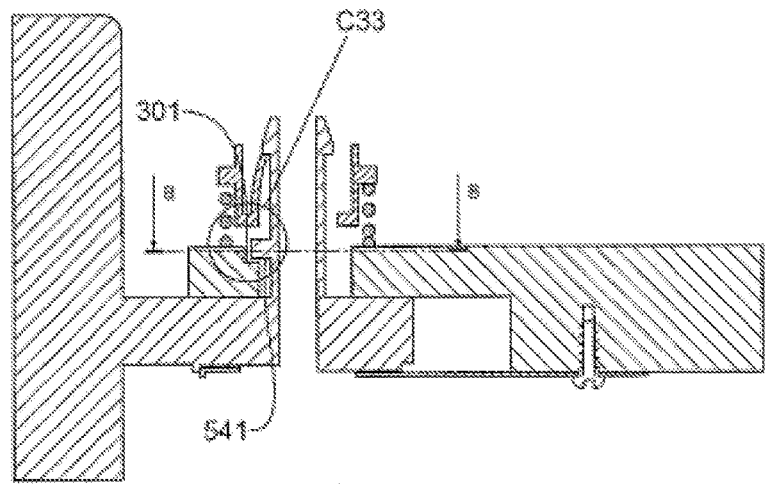
FIG. 51A is a cross-sectional view through section lines shown on FIG. 50A.
Figure 51B:
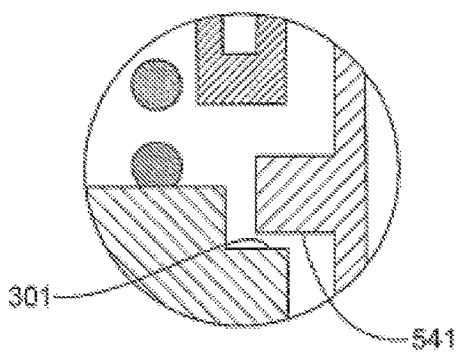
FIG. 51B is a magnified view of the portion of the pivot mechanism indicated by circle C33 on FIG. 51A.
Figure 51C:
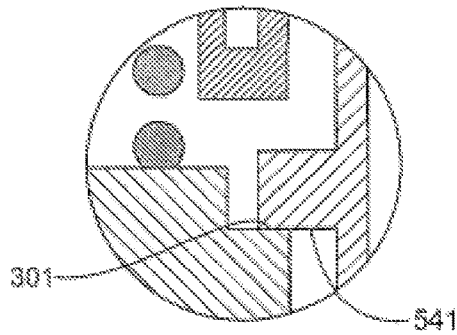
FIG. 51C is a similar view to that of FIG. 51B, but with a down force applied to the mirror head.
Figure 52:
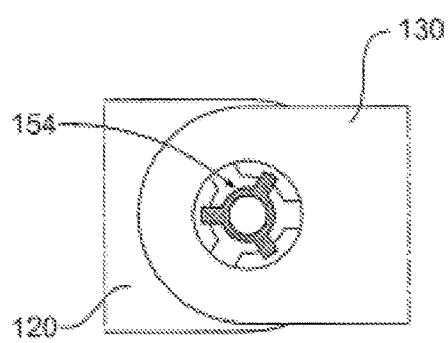
FIG. 52 is a cross-sectional view through section lines B-B shown on FIG. 51A while the pivot mechanism is in its normal drive position.

FIG. 44B shows clearance between case frame surface 301 and the spring tie reaction surface 541. This is the normal in-use condition without a significant torque-inducing up or down force applied to the rear vision device head. In contrast, FIG. 44C shows case frame surface 301 lifted and hard up against the spring tie reaction surface 541 as a result of a significant torque-inducing up force applied to the mirror head (for instance by a person attempting to manually lift the head).

With the embodiment shown in FIGS. 39 to 45, the case frame portion 130 lifts with respect to the base frame portion 120 when the (mirror or camera) head is rotated away from the deployed or drive position. This is in contrast with the first and second embodiments described above where "zero lift" is achieved.

Now turning to FIGS. 46 and 47, another embodiment of the invention is shown. This embodiment of the invention is a "zero lift" embodiment like the first and second embodiments described above. With this embodiment of the invention, the detent sits at the interface between a lower portion of the base frame portion 120 and an upper surface of the floating end 178 of the support arm 170.

Figure 53:
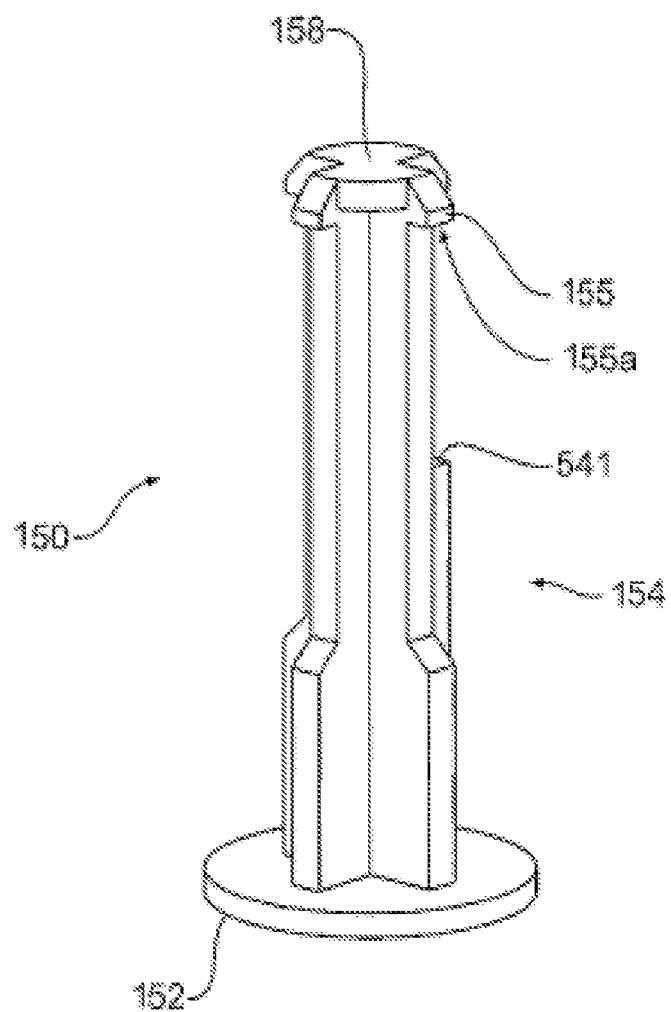
FIG. 53 is an isometric view of an alternative pivot tie for the pivot mechanism of the embodiments of the invention shown in FIGS. 19-28 and 29-38 looking from above.

Now turning to FIG. 53, an isometric view of an alternative pivot tie 150 for the pivot mechanism of the first and second embodiments of the invention is shown. This pivot tie 150 includes a spring tie reaction feature in the form of a single spring tie reaction surface 541. The number of spring tie reaction surfaces 541 can be varied. Two, three or more reaction surfaces 541 may be provided (aside from the four reaction surfaces 541 shown in FIGS. 19 and 29 and the one reaction surfaces 541 shown in FIG. 53).

Figure 54A:
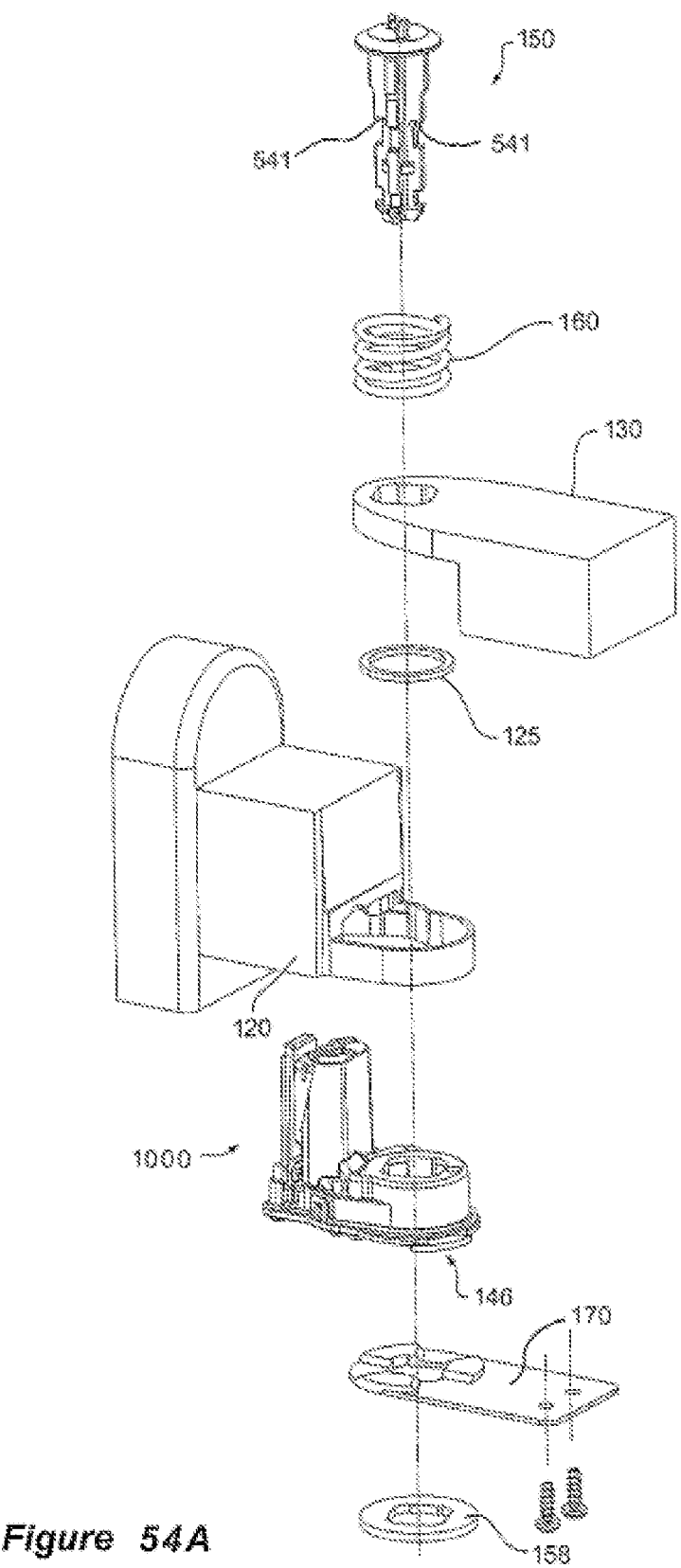
FIG. 54A is an exploded isometric view of a pivot mechanism according to a further embodiment of the invention that includes a powerfold mechanism mounted to the base frame portion.

FIG. 54A is an exploded isometric view of a pivot mechanism according to a fifth embodiment of the invention that includes a powerfold mechanism 1000 mounted to the base frame portion 120. The spring tie 150 includes spring tie reaction features in the form of spring tie reaction surfaces 541.

The powerfold mechanism 1000 is operably interposed between the base frame portion 120 and the case frame portion 130. The powerfold mechanism 1000 includes the second set of detent features 146.

The powerfold mechanism 1000 is operable to electrically drive the case frame portion 130 with respect to the base frame portion 120.

Figure 54B:
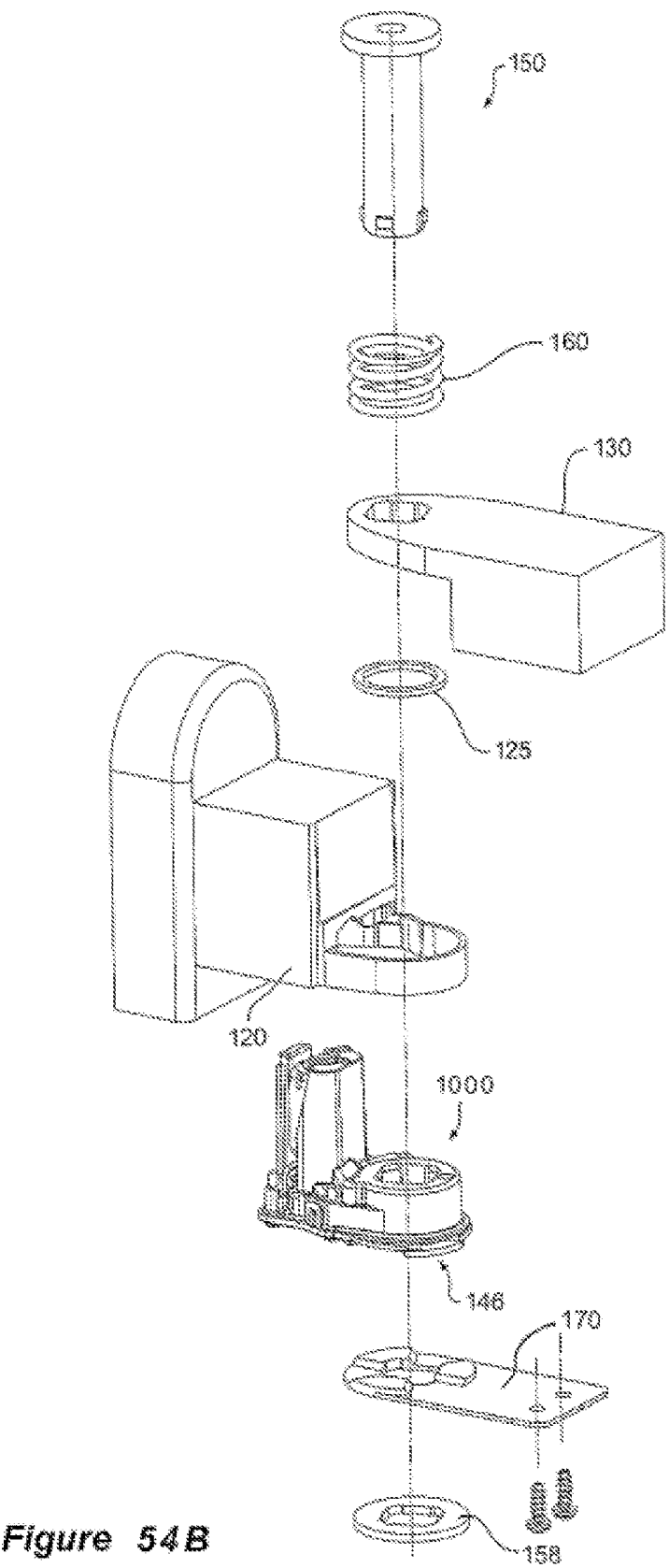
FIG. 54B is an exploded isometric view of the pivot mechanism of FIG. 54A that includes a simple spring tie without spring tie reaction features.
Figure 55:
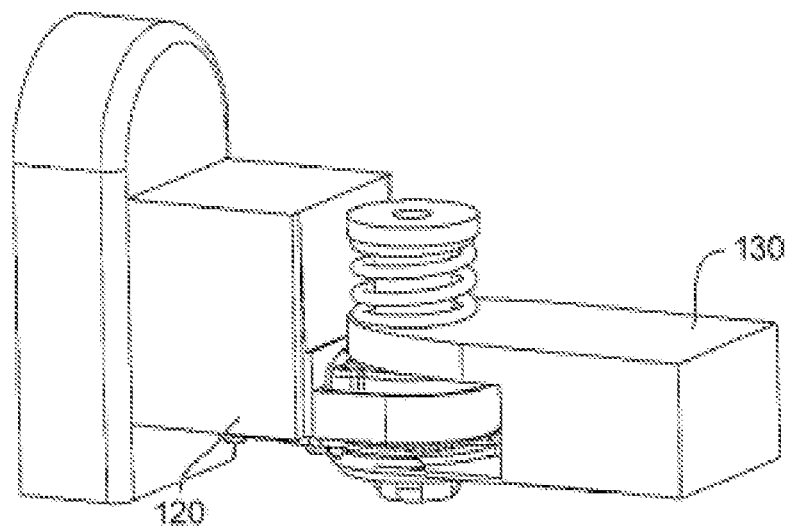
FIGS. 55, 56 and 57 are isometric, side and plan views of the pivot mechanism shown in FIG. 54B, with the pivot mechanism in a deployed or drive position.
Figure 56:
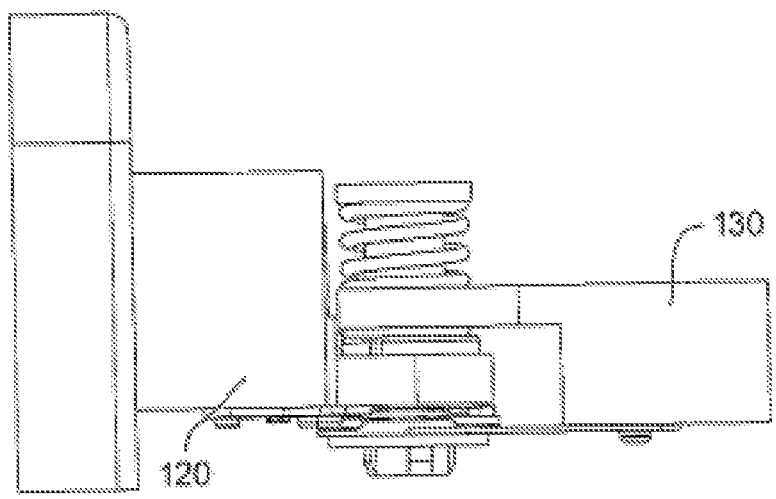
Figure 57:
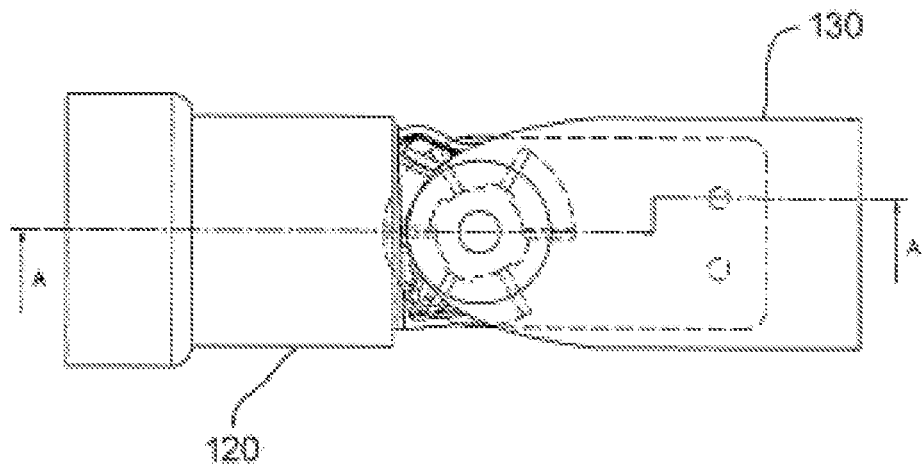
Figure 58:
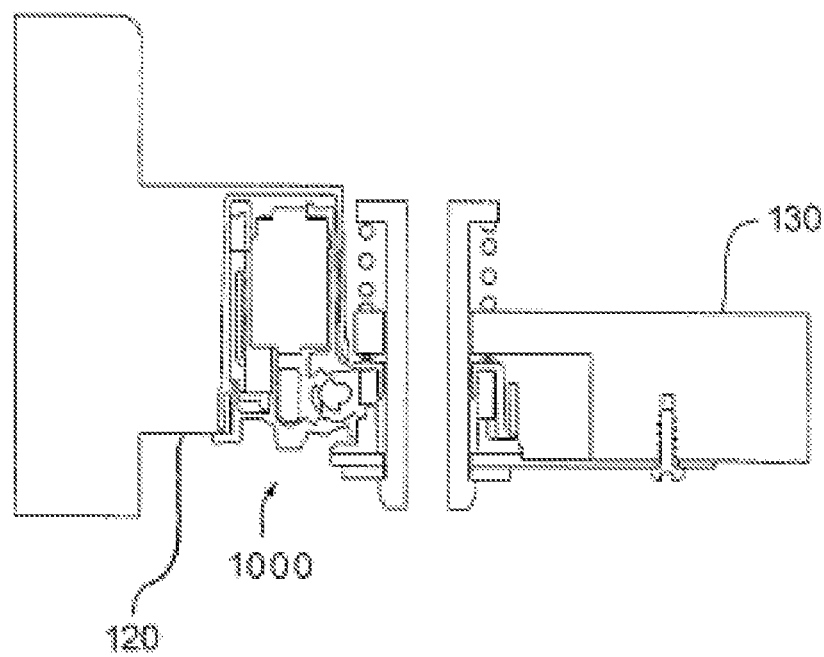
FIG. 58 is a cross-sectional view through section lines A-A shown on FIG. 57.

FIG. 54B is an exploded isometric view of an alternative pivot mechanism that includes a powerfold mechanism 1000 mounted to the base frame portion 120. The spring tie 150 shown in FIG. 54B is the type shown in FIG. 1 of the applicant's earlier application PCT/IB2014/061261 which is hereby incorporated by reference.

Figure 59A:
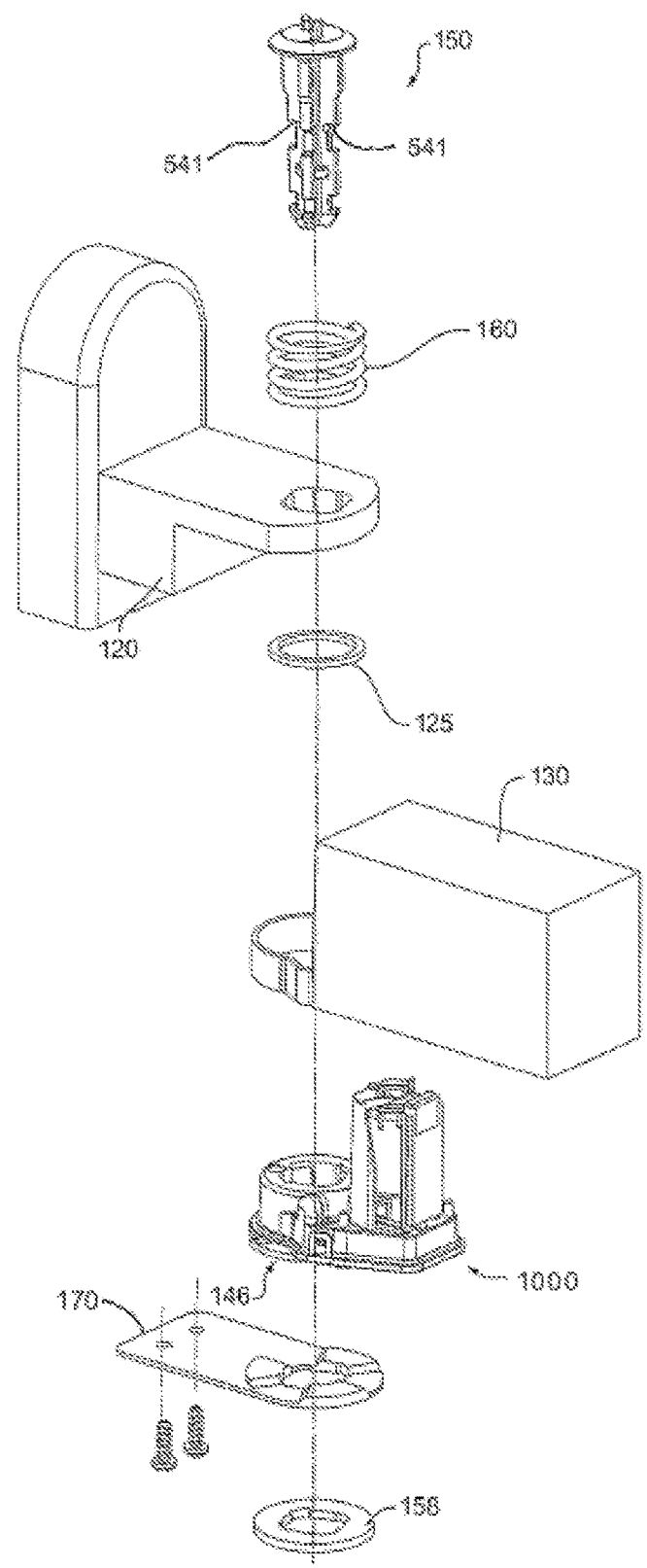
FIG. 59A is an exploded isometric view of a pivot mechanism according to a further embodiment of the invention that includes a powerfold mechanism mounted to the base frame portion.

FIG. 59A is an exploded isometric view of a pivot mechanism according to another embodiment of the invention that includes a powerfold mechanism 1000 mounted to the base frame portion 120. The spring tie 150 includes spring tie reaction features in the form of spring tie reaction surfaces 541.

Figure 59B:
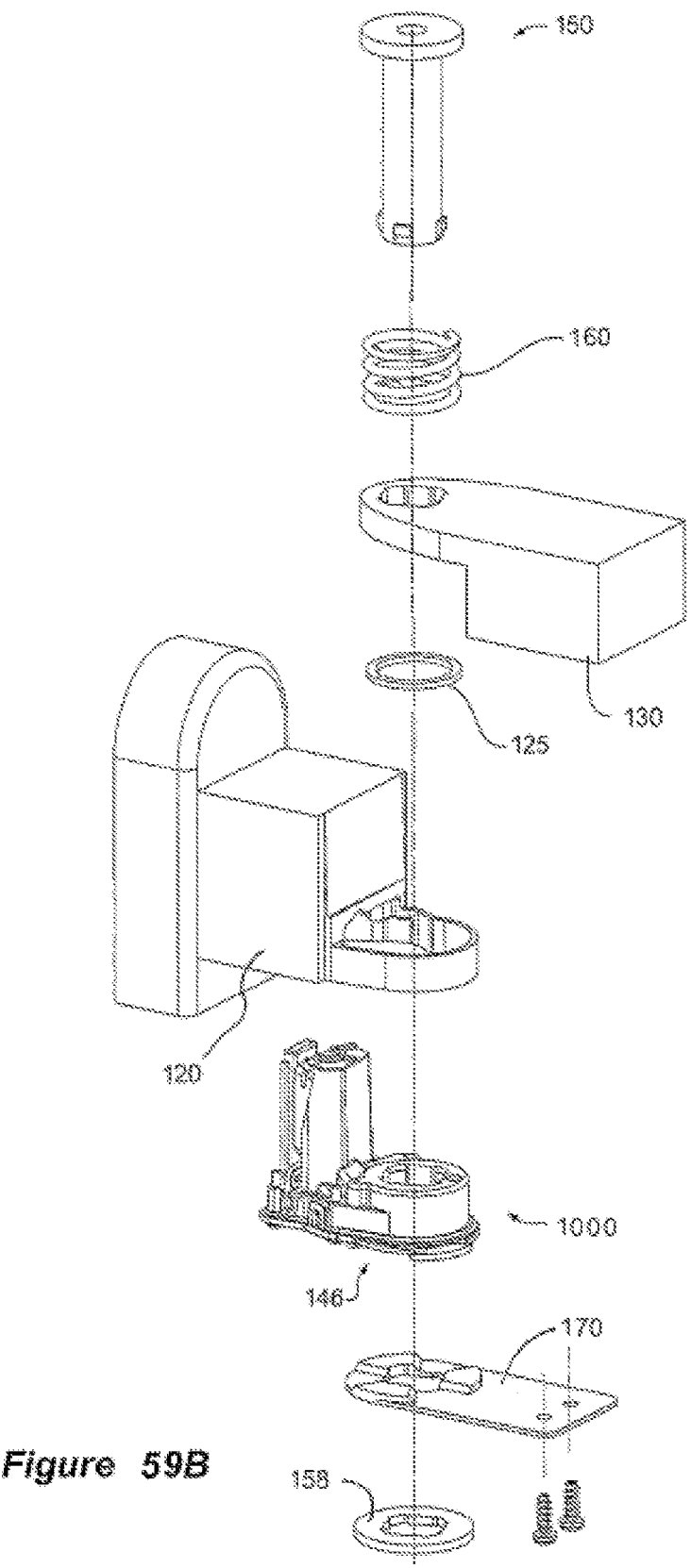
FIG. 59B is an exploded isometric view of the pivot mechanism of FIG. 59A that includes a simple spring tie without spring tie reaction features.
Figure 60:
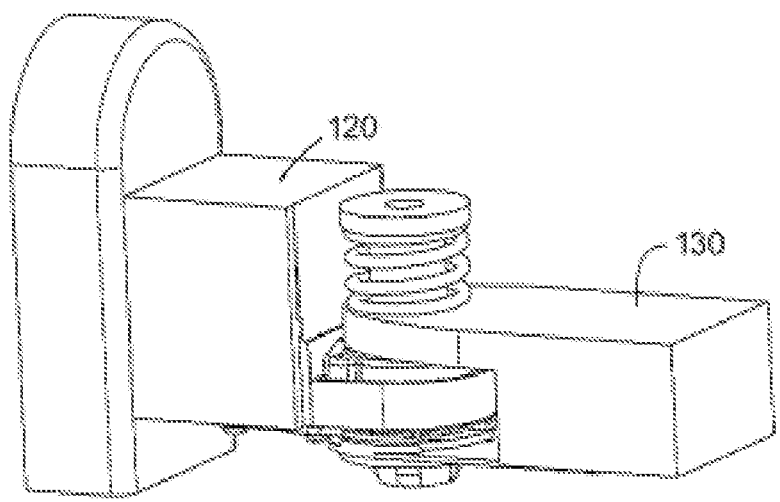
FIGS. 60, 61 and 62 are isometric, side and plan views of the pivot mechanism shown in FIG. 59B, with the pivot mechanism in a deployed or drive position.
Figure 61:
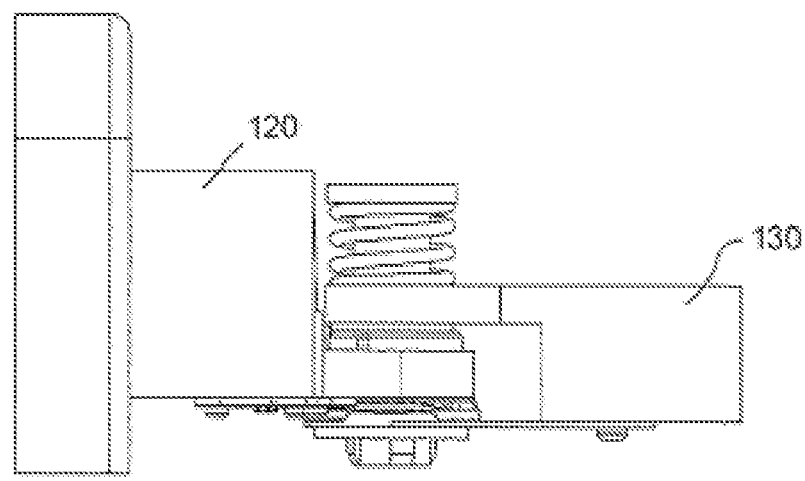
Figure 62:
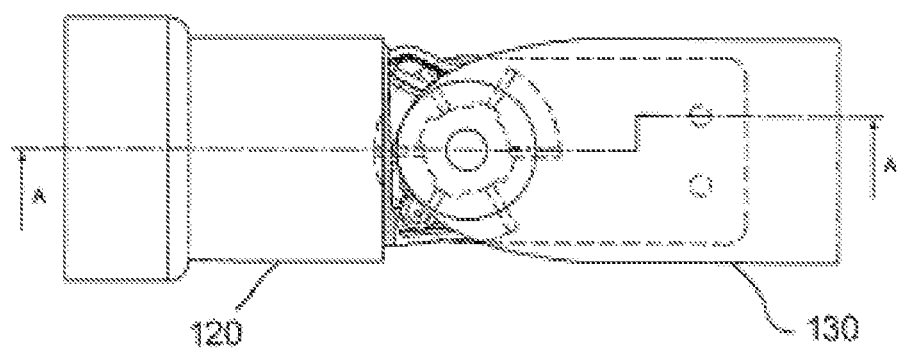
Figure 63:
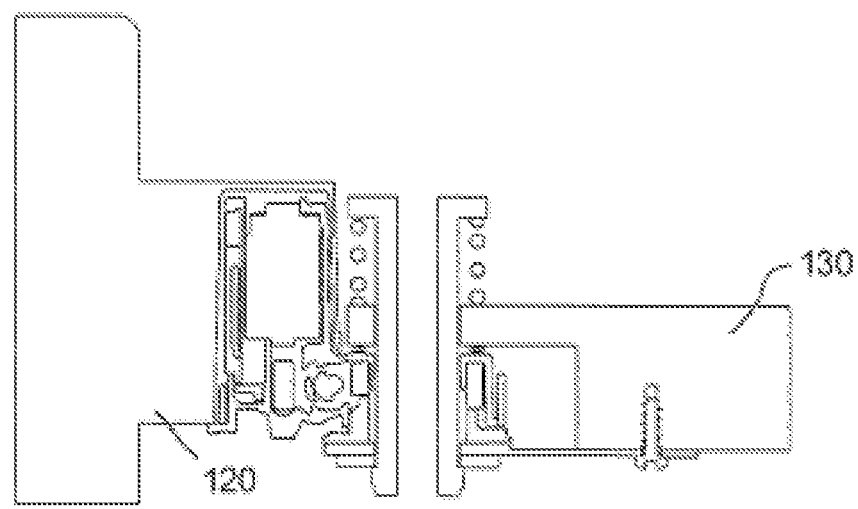
FIG. 63 is a cross-sectional view through section lines A-A shown on FIG. 62.

FIG. 59B is an exploded isometric view of an alternative pivot mechanism that includes a powerfold mechanism 1000 mounted to the base frame portion 120. The spring tie 150 shown in FIG. 54B is the type shown in FIG. 1 of the applicant's earlier application PCT/IB2014/061261 which is hereby incorporated by reference. Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pivot mechanism for a vehicle external rear vision assembly, the pivot mechanism including:
   a base frame portion integral with, or attachable to, a vehicle-mountable base frame;
   a case frame portion mounted to the base frame portion for rotation about a pivot axis, the case frame portion integral with, or attachable to, a case frame adapted to support a rear vision device, the case frame movable about the pivot axis from a deployed position to a folded position;
   a detent operable between the base frame portion and the case frame portion, the detent having: an engaged position where the case frame portion is held in a selected position with respect to the base frame portion, and a disengaged position allowing the rotation about the pivot axis;
   a spring mechanism clamping the case frame portion to the base frame, the spring mechanism including:
   a compression spring disposed around the pivot axis, the compression spring having an internal radius; and
   a spring tie, the spring tie having a first tie end and a second tie end, the first and second tie ends spaced apart from each other and connected by a tie shaft, the tie shaft passing through the spring, the spring tie shaft including a spring tie reaction feature,
   whereby the case frame portion, the base frame portion and the spring tie are mutually arranged and constructed such that, in the deployed position, a torque applied to the case frame portion about an axis orthogonal to the pivot axis by an external force is resisted by the spring tie reaction feature.

2. The pivot mechanism of claim 1 wherein the spring tie reaction feature includes a plurality of spring tie reaction surfaces.

3. The pivot mechanism of claim 2 wherein the plurality of spring tie reaction surfaces are circumferentially spaced apart around the spring tie shaft.

4. The pivot mechanism of claim 3 wherein each spring tie reaction surface is located radially inboard of the internal radius of the compression spring.

5. The pivot mechanism of claim 1 wherein the compression spring includes one or more disc springs.

6. The pivot mechanism of claim 1 wherein the spring includes a first spring end and a second spring end, the first spring end compressed retained in compression against either one of the first and second tie ends.

7. The pivot mechanism of claim 1 including a powerfold mechanism operably interposed between the base frame portion and the case frame portion, wherein the powerfold mechanism is operable to electrically drive the case frame portion with respect to the base frame portion.

8. A pivot mechanism for a vehicle external rear vision assembly, the pivot mechanism including:
   a base frame portion integral with, or attachable to, a vehicle-mountable base frame;
   a case frame portion mounted to the base frame portion for rotation about a pivot axis, the case frame portion integral with, or attachable to, a case frame adapted to support a rear vision device, the case frame movable about the pivot axis from a deployed position to a folded position;
   a spring mechanism clamping the case frame portion to the base frame, the spring mechanism including:
   a compression spring disposed around the pivot axis, the compression spring having an internal radius; and
   a spring tie, the spring tie having a first tie end and a second tie end, the first and second tie ends spaced apart from each other and connected by a tie shaft, the tie shaft passing through the spring, the spring tie shaft including a spring tie reaction feature,
   whereby, in a deployed position, the spring tie reaction feature is positioned such that rotation of the case frame portion about an axis orthogonal to the pivot axis is resisted by the spring tie reaction feature.

9. A pivot mechanism for a vehicle external rear vision assembly, the mechanism including: a base frame portion integral with, or attachable to, a vehicle-mountable base frame;
   a case frame portion mounted to the base frame portion for rotation about a pivot axis, the case frame portion integral with, or attachable to, a case frame adapted to support a rear vision mirror;
   a detent operable between the base frame portion and the case frame portion, the detent having;
   an engaged position where the case frame portion is held in a selected position with respect to the base frame portion, and
   a disengaged position allowing the rotation about the pivot axis, the detent including a first set of detent features and a second set of detent features;
   a spring mechanism clamping the case frame portion to the base frame portion and the first set of detent features to the second set of detent features;
   a support arm having an attachment end and a floating end, the floating end supporting the first set of detent features, the first set of detent features fixed against rotation about the pivot axis with respect to the support arm, but displaceable relative to the attachment end in a direction substantially parallel to the pivot axis; and
   a powerfold mechanism operably interposed between the base frame portion and the case frame portion, the powerfold mechanism including the second set of detent features, wherein the attachment end of the support arm is fixed to, and is fixed against rotation with respect to, one of: the case frame portion and the base frame portion, and wherein the second set of detent features is fixed against rotation with respect to the other of: the case frame portion and the base frame portion, and wherein the powerfold mechanism is operable to electrically drive the case frame portion with respect to the base frame portion.

\* \* \* \* \*